US012795125B2

(12) United States Patent
Tsai et al.

(10) Patent No.: US 12,795,125 B2
(45) Date of Patent: Nov. 10, 2026

(54) SIGNALING CROSS COMPONENT LINEAR MODEL

(71) Applicant: MediaTek Singapore Pte. Ltd., Singapore (SG)

(72) Inventors: Chia-Ming Tsai, Hsinchu City (TW); Olena Chubach, San Jose, CA (US); Chun-Chia Chen, Hsinchu City (TW); Ching-Yeh Chen, Hsinchu City (TW); Man-Shu Chiang, Hsinchu City (TW); Yu-Ling Hsiao, Hsinchu City (TW); Tzu-Der Chuang, Hsinchu City (TW); Chih-Wei Hsu, Hsinchu City (TW); Yu-Wen Huang, Hsinchu City (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 18/703,974

(22) PCT Filed: Oct. 11, 2022

(86) PCT No.: PCT/CN2022/124622
§ 371 (c)(1),
(2) Date: Apr. 23, 2024

(87) PCT Pub. No.: WO2023/071778
PCT Pub. Date: May 4, 2023

(65) Prior Publication Data
US 2025/0008125 A1 Jan. 2, 2025

Related U.S. Application Data

(60) Provisional application No. 63/273,173, filed on Oct. 29, 2021.

(51) Int. Cl.
*H04N 19/186* (2014.01)
*H04N 19/103* (2014.01)
(Continued)

(52) U.S. Cl.
CPC ......... *H04N 19/186* (2014.11); *H04N 19/103* (2014.11); *H04N 19/159* (2014.11);
(Continued)

(58) Field of Classification Search
CPC .. H04N 19/186; H04N 19/103; H04N 19/159; H04N 19/176; H04N 19/50; H04N 19/70
(Continued)

(56) References Cited

U.S. PATENT DOCUMENTS 12,010,299 B2 * 6/2024 Lee ........................ H04N 19/11
2020/0296391 A1 * 9/2020 Choi ...................... H04N 19/11
(Continued)

FOREIGN PATENT DOCUMENTS

CN 101668207 B 12/2011
CN 113366836 A 9/2021
(Continued)

OTHER PUBLICATIONS

International Search Report and Written Opinion dated Dec. 30, 2022, issued in application No. PCT/CN2022/124622.
(Continued)

*Primary Examiner* — Albert Kir
(74) *Attorney, Agent, or Firm* — McClure, Qualey & Rodack, LLP

(57) ABSTRACT

A video coding system that uses chroma prediction is provided. The system receives data for a block of pixels to be encoded or decoded as a current block of a current picture of a video. The system constructs a chroma prediction model based on luma and chroma samples neighboring the current block. The system signals a set of chroma prediction related syntax element and a refinement to the chroma prediction model. The system performs chroma prediction by applying the chroma prediction model to reconstructed luma samples of the current block to obtain predicted chroma samples of
(Continued)

the current block. The system uses the predicted chroma samples to reconstruct chroma samples of the current block or to encode the current block.

17 Claims, 15 Drawing Sheets

(51) Int. Cl.
*H04N 19/159* (2014.01)
*H04N 19/176* (2014.01)
*H04N 19/50* (2014.01)
*H04N 19/70* (2014.01)

(52) U.S. Cl.
CPC ........... *H04N 19/176* (2014.11); *H04N 19/50* (2014.11); *H04N 19/70* (2014.11)

(58) Field of Classification Search
USPC ...................................................... 375/240.12
See application file for complete search history.

(56) References Cited

U.S. PATENT DOCUMENTS

| | | | | |
|---|---|---|---|---|
| 2021/0136409 | A1 | 5/2021 | Ma | |
| 2021/0314564 | A1 | 10/2021 | Zeng | |
| 2021/0352271 | A1* | 11/2021 | Choi | H04N 19/136 |
| 2021/0385469 | A1* | 12/2021 | Deng | H04N 19/186 |
| 2021/0392328 | A1* | 12/2021 | Kang | H04N 19/136 |
| 2022/0124340 | A1* | 4/2022 | Deng | H04N 19/176 |
| 2022/0417517 | A1 | 12/2022 | Choi | |
| 2024/0292005 | A1* | 8/2024 | Ghaznavi Youvalari | H04N 19/593 |
| 2025/0008084 | A1* | 1/2025 | Astola | H04N 19/186 |
| 2025/0008125 | A1* | 1/2025 | Tsai | H04N 19/11 |
| 2025/0039428 | A1* | 1/2025 | Kuo | H04N 19/186 |

FOREIGN PATENT DOCUMENTS

| | | | | |
|---|---|---|---|---|
| EP | 3 641 312 | A1 | 4/2020 | |
| EP | 4367885 | A1 | 5/2024 | |
| GB | 2580106 | A | 7/2020 | |
| KR | 20140081933 | A | 7/2014 | |
| WO | WO-2020036130 | A1 * | 2/2020 | H04N 19/105 |
| WO | WO-2020036132 | A1 * | 2/2020 | H04N 19/186 |
| WO | 2020/108591 | A1 | 6/2020 | |
| WO | 2020/132556 | A2 | 6/2020 | |
| WO | 2020/145792 | A1 | 7/2020 | |
| WO | 2020141813 | A2 | 7/2020 | |
| WO | 2020143825 | A1 | 7/2020 | |
| WO | 2020/236038 | A1 | 11/2020 | |
| WO | 2021032171 | A1 | 2/2021 | |
| WO | WO-2021127430 | A1 * | 6/2021 | H04N 19/52 |

OTHER PUBLICATIONS

Chinese language office action dated Jul. 18, 2023, issued in application No. TW 111141063.
Partial Supplementary European Search Report dated Aug. 22, 2025, issued in application No. EP 22885657.1.
Chen, J., et al.; "Algorithm description for Versatile Video Coding and Test Model 9 (VTM 9);" Joint Video Experts Team (JVET) of ITU-T SG 16 WP 3 and ISO/IEC JTC 1/SC 29/WG 11; Apr. 2020; pp. 1-97.
Lainema, J., et al.; "AHG12: Slope adjustment for CCLM;" Joint Video Experts Team (JVET) of ITU-T SG 16 WP 3 and ISO/IEC JTC 1/SC 29; Jan. 2022; pp. 1-3.
Extended European Search Report dated Nov. 14, 2025, issued in application No. EP 22885657.1.

* cited by examiner

SIGNALING CROSS COMPONENT LINEAR MODEL

CROSS REFERENCE TO RELATED PATENT APPLICATION(S)

The present disclosure is part of a non-provisional application that claims the priority benefit of U.S. Provisional Patent Application No. 63/273,173, filed on 29 Oct. 2021. Content of above-listed application is herein incorporated by reference.

TECHNICAL FIELD

The present disclosure relates generally to video coding. In particular, the present disclosure relates to methods of signaling parameters of chroma prediction.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

Versatile Video Coding (VVC) is a codec designed to meet upcoming needs in videoconferencing, over-the-top streaming, mobile telephony, etc. VVC address video needs from low resolution and low bitrates to high resolution and high bitrates, high dynamic range (HDR), 360 omnidirectional, etc. VVC supports YCbCr color spaces with 4:2:0 sampling, 10 bits per component, YCbCr/RGB 4:4:4 and YCbCr 4:2:2, with bit depths up to 16 bits per component, with HDR and wide-gamut color, along with auxiliary channels for transparency, depth, and more.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a video coding system that uses chroma prediction. The system receives data for a block of pixels to be encoded or decoded as a current block of a current picture of a video. The system constructs a chroma prediction model based on luma and chroma samples neighboring the current block. The system signals a set of chroma prediction related syntax element and a refinement to the chroma prediction model. The system performs chroma prediction by applying the chroma prediction model to reconstructed luma samples of the current block to obtain predicted chroma samples of the current block. The system uses the predicted chroma samples to reconstruct chroma samples of the current block or to encode the current block.

In some embodiments, different signaling methods are used to signal the set of chroma prediction related syntax elements for when the current block is greater than or equal to a threshold size or for when the current block is smaller than a threshold size. The chroma prediction model is constructed according to the set of chroma prediction related syntax elements. In some embodiments, the chroma prediction model has a set of model parameters that includes a scaling parameter and an offset parameter.

In some embodiments, the set of chroma prediction related syntax elements may select one of multiple different chroma prediction modes (e.g., LM-T/LM-L/LM-LT) that refer to different regions neighboring the current block, and the chroma prediction model is constructed according to the selected chroma prediction mode. A list of candidates that includes the multiple different chroma prediction modes may be reordered based on a comparison of the chroma predictions obtained by the different chroma prediction modes.

In some embodiments, one of the multiple chroma prediction modes is chosen as the selected chroma prediction mode based on a luma intra angle information of the current block. In some embodiments, one of the multiple chroma prediction modes is chosen as the selected chroma prediction mode based on discontinuity measurement between predicted chroma samples of the current block and reconstructed chroma samples of a neighboring region (e.g., L-shape) of the current block. In some embodiments, one of the multiple chroma prediction modes is chosen as the selected chroma prediction mode based on a splitting information of a neighboring block. In some embodiments, one of the multiple chroma prediction modes is chosen as the selected chroma prediction mode based on a size, a width, or a height of the current block. In some embodiments, chroma prediction models constructed according to different chroma prediction modes are used to perform chroma prediction for different sub-regions of the current block.

In some embodiments, the chroma prediction model derived from neighboring luma and chroma samples of the current block is further refined. The refinement to the chroma prediction model may include an adjustment to the scaling parameter (Δa) and an adjustment to the offset parameter (Δb). The signaled refinement may also include a sign of the adjustment to the scaling parameter of at least one chroma component.

In some embodiments, the signaled refinement includes adjustments to the scaling parameter but not the offset parameter of each chroma component. The signaled refinement may include one adjustment that is applicable to the scaling parameters of both chroma components, while the offset parameter of each chroma component is implicitly adjusted at the video decoder. In some embodiments, the signaled refinement includes adjustment to the model parameters (a and b) of a first chroma component but no adjustment to the model parameters of a second chroma component.

In some embodiments, the signaled refinement is applicable to only a sub-region of the current block, wherein separate refinements for scaling and offset parameters are coded and signaled for different regions of the current block. In some embodiments, the chroma prediction model is one of multiple chroma prediction models applied to the reconstructed luma samples of the current block to obtain the predicted chroma samples of the current block, and the signaled refinement includes adjustment to the model parameters of the multiple chroma prediction models.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Cross Component Linear Model (CCLM)

Cross Component Linear Model (CCLM) or Linear Model (LM) mode is a chroma prediction mode in which chroma components of a block is predicted from the collocated reconstructed luma samples by linear models. The parameters (e.g., scale and offset) of the linear model are derived from already reconstructed luma and chroma samples that are adjacent to the block. For example, in VVC, the CCLM mode makes use of inter-channel dependencies to predict the chroma samples from reconstructed luma samples. This prediction is carried out using a linear model in the form of:

$$P(i, j) = a \cdot rec'_L(i, j) + b \qquad \text{eq. (1)}$$

P(i, j) in eq. (1) represents the predicted chroma samples in a CU (or the predicted chroma samples of the current CU) and $rec'_L(i, j)$ represents the reconstructed luma samples of the same CU (or the corresponding reconstructed luma samples of the current CU) which are down-sampled for the case of non-4:4:4 color format. The model parameters a (scaling parameter) and b (offset parameter) are derived based on reconstructed neighboring luma and chroma samples at both encoder and decoder side without explicitly signaling (i.e., implicitly derivation).

The model parameters a and b from eq. (1) are derived based on reconstructed neighboring luma and chroma samples at both encoder and decoder sides to avoid signaling overhead. In some embodiments, a linear minimum mean square error (LMMSE) estimator was used to derive of the model parameters a and b. In some embodiments, only partial neighboring samples (for example, only four neighboring samples) are involved in CCLM model parameter derivation to reduce the computational complexity.

Figure 1:
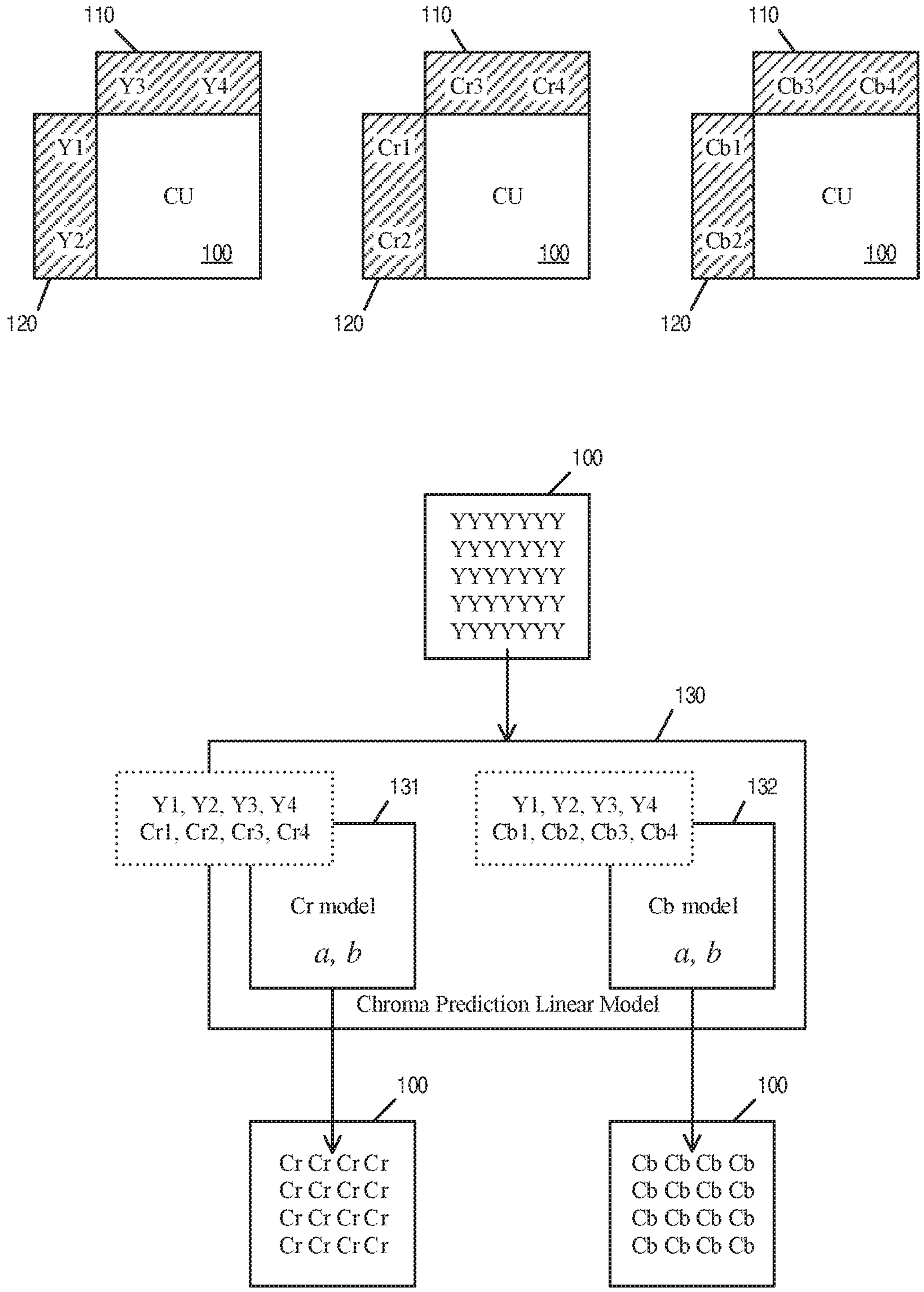
FIG. 1 conceptually illustrates using reconstructed neighboring luma and chroma samples to calculate chroma prediction model parameters.

FIG. 1 conceptually illustrates using reconstructed neighboring luma and chroma samples to calculate chroma prediction model parameters. The figure illustrates a CU 100, which has neighboring regions (e.g., in neighboring CUs to the top and to the left) 110 and 120. The neighboring regions have chroma (Cr/Cb) and luma (Y) samples that are already reconstructed.

Some of the corresponding reconstructed luma and chroma samples are used to construct a chroma prediction model 130. The chroma prediction model 130 includes two linear models 131 and 132 for the two chroma components Cr and Cb, respectively. Each linear model 131 and 132 has its own set of model parameters a (scaling) and b (offset). The linear models 131 and 132 can be applied to the luma samples of the CU 100 to produce predicted chroma samples (Cr and Cb components) of the CU 100.

VVC specifies three CCLM modes for a CU: CCLM_LT, CCLM_L, and CCLM_T. These three modes differ with respect to the locations of the reference samples that are used for model parameter derivation. For CCLM_T mode, luma and chroma samples from the top boundary (e.g., the neighboring region 110) are used to compute parameters a and b. For CCLM_L mode, samples from the left boundary (e.g., the neighboring region 120) are used. For CCLM_LT mode, samples from both the top and the left boundaries are used. (The top boundary and the left boundary neighboring regions of the CU are collectively referred to as the L-neighbor of the CU, as the top and left boundaries together form an L-shaped region neighboring the CU.)

The prediction process of CCLM modes includes three steps: 1) down-sampling of the luma block and its neighboring reconstructed samples to match the size of corresponding chroma block (for example, for the case of non-4:4:4 color format), 2) deriving model parameters based on the reconstructed neighboring samples, 3) applying the model equation eq. (1) to generate the predicted chroma samples (or chroma intra prediction samples). For down-sampling of the luma component, to match the chroma sample locations for 4:2:0 or 4:2:2: color format video sequences, two types of down-sampling filter can be applied to luma samples, both of which have a 2-to-1 down-sampling ratio in the horizontal and vertical directions. These two types of filters $f_1$ and $f_2$ correspond to "type-0" and "tvne-2" 4:2:0 chroma format content, respectively.

$$f_1 = \begin{pmatrix} 0 & 1 & 0 \\ 1 & 4 & 1 \\ 0 & 1 & 0 \end{pmatrix}, \qquad (2)$$

$$f_2 = \begin{pmatrix} 1 & 2 & 1 \\ 1 & 2 & 1 \end{pmatrix}$$

Based on SPS-level flag information, a 2-dimensional 6-tap or 5-tap filter is applied to the luma samples within the current block as well as its neighboring luma samples. An exception happens if the top line of the current block is a CTU boundary. In this case, a one-dimensional filter [1, 2, 1]/4 is applied to the above neighboring luma samples in order to avoid the usage of more than one luma line above the CTU boundary.

Figure 2:
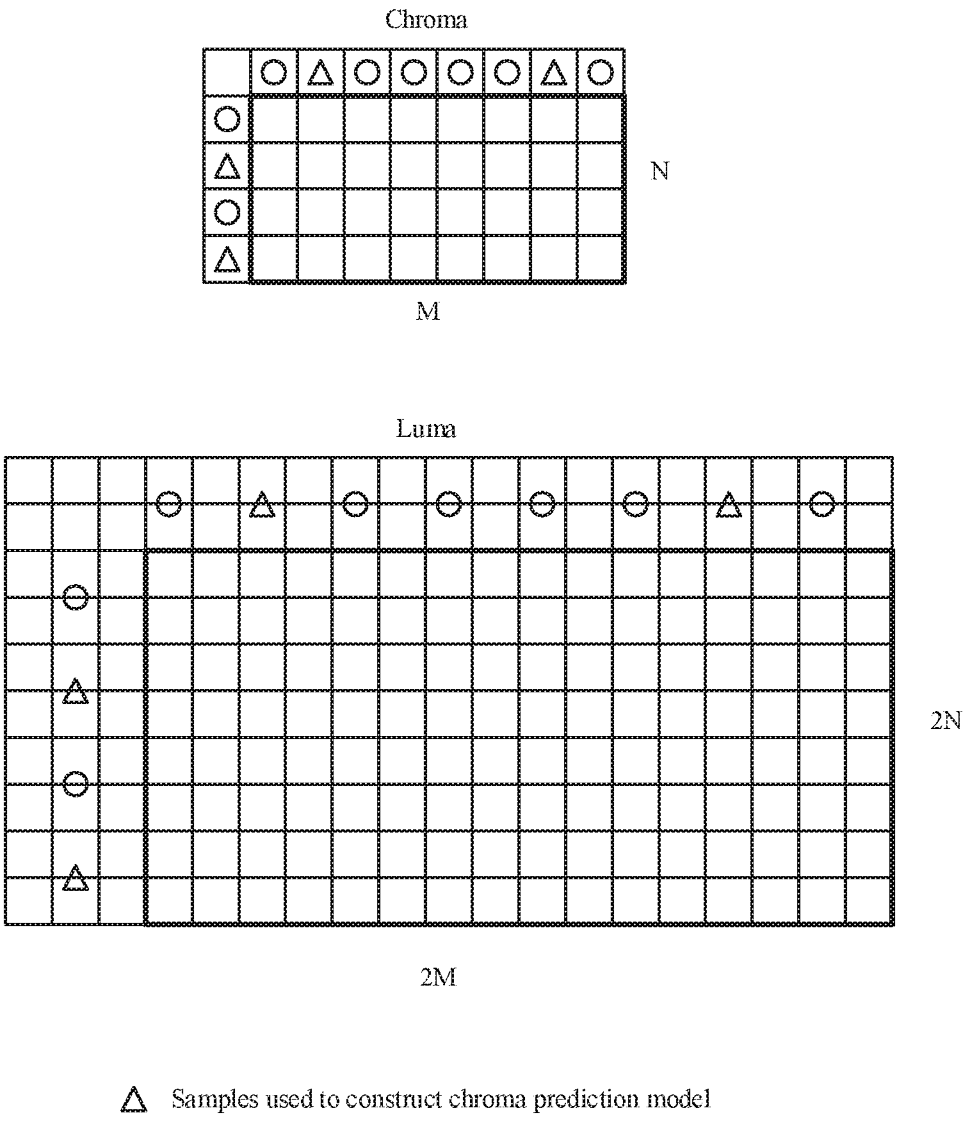
FIG. 2 shows the relative sample locations of M×N chroma block, the corresponding 2M×2N luma block, and their neighboring samples.

FIG. 2 shows the relative sample locations of M×N chroma block, the corresponding 2M×2N luma block, and their neighboring samples. The figure shows locations of the corresponding chroma and luma samples of "type-0" content. In the figure, the four samples used in the CCLM_LT mode are marked by triangular shape. They are located at the positions of M/4 and M·¾ at the top boundary and at the positions of N/4 and N·¾ at the left boundary. For CCLM_T and CCLM_L modes (not shown in the figure), the top and left boundary are extended to a size of (M+N) samples, and the four samples used for the model parameter derivation are located at positions (M+N)/8, (M+N)·⅜, (M+N)·⅝, and (M+N)·⅞.

Once the samples used for CCLM model parameter derivation are selected, four comparison operations are used to determine or identify the two smallest and the two largest luma sample values among them. Let $X_l$ denote the average of the two largest luma sample values and let $X_s$ denote the average of the two smallest luma sample values. Similarly, let $Y_l$ and $Y_s$ denote the averages of the corresponding chroma sample values. Then, the linear model parameters a and b are obtained according to the following equation:

$$a = \frac{Y_l - Y_s}{X_l - X_s}, \qquad (3)$$

$$b = Y_{s-a} \cdot X_s$$

In eq. (3), the division operation to calculate the scaling parameter a is implemented with a look-up table. In some embodiments, to reduce the memory required for storing this table, the difference value, which is the difference between the maximum and minimum values, and the parameter a are expressed by an exponential notation. Specifically, the difference value is approximated with a 4-bit significant part and an exponent. Consequently, the table for 1/diff only consists of 16 elements. This has the benefit of both reducing the complexity of the calculation and of decreasing the memory size required for storing the tables.

II. Signaling Chroma Prediction Model Parameters

In some embodiments, all the parameters of a linear model (e.g., a, b) for chroma prediction are defined and derived at both encoder and decoder. In some embodiments, at least some of the parameters can be explicitly signaled to decoder. For example, all parameters may be defined at the encoder and then all or some of them are signaled to the decoder, while others are defined at the decoder.

Figure 3A:
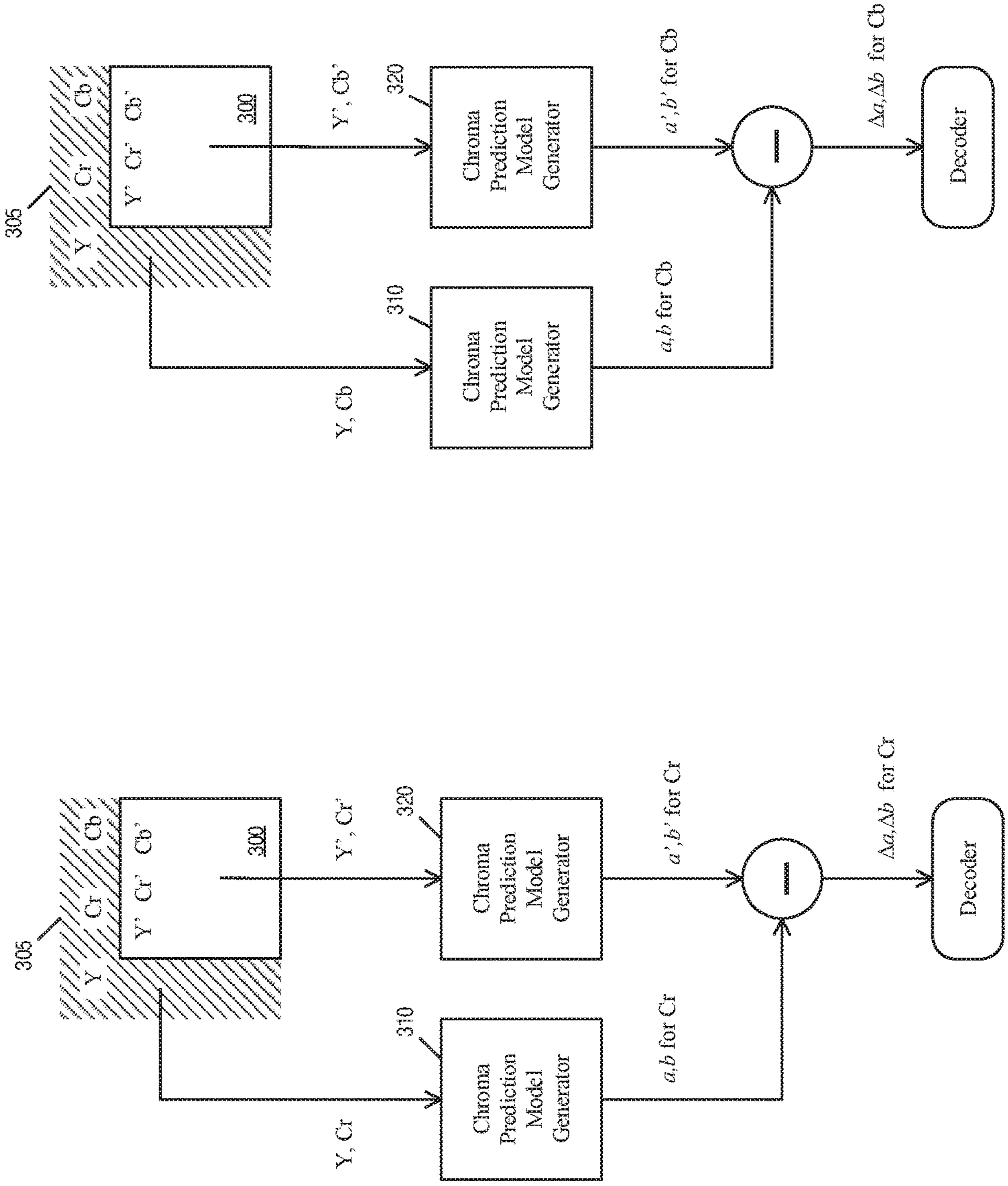
FIGS. 3A-3B conceptually illustrates a dataflow for refinement of chroma prediction model parameters for a coding unit.
Figure 3B:
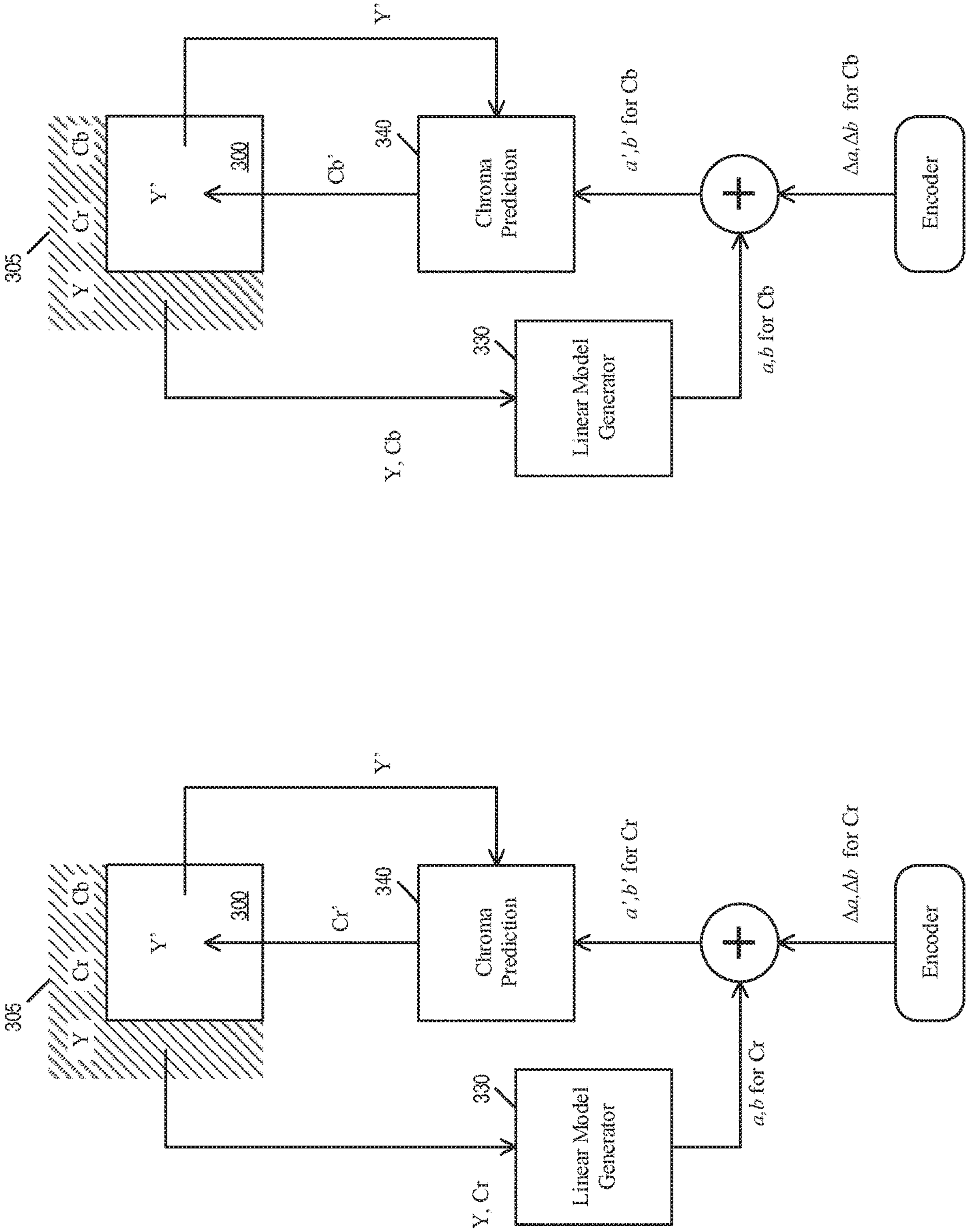

In some embodiment, the encoder may calculate a prediction difference (also referred to as refinement) for model parameters a and/or b and signals the refinement (Δa and/or Δb) to the decoder, resulting in more precise or accurate model parameters (for example, values for the chroma prediction). Such a prediction difference or refinement of the parameter a (and/or b) can be defined as the difference between "a derived from the current block" and "a derived from the neighboring samples". FIGS. 3A-3B conceptually illustrates a dataflow for refinement of chroma 20) prediction model parameters for a CU 300.

FIG. 3A shows, when encoding the CU 300, the encoder uses reconstructed luma and chroma samples in neighboring regions 305 of the CU 300 (e.g., along top and/or left boundary) to generate (by using a linear model generator 310) a first chroma prediction model having parameters a and b for each chroma component Cr/Cb. Incoming luma and chroma samples of the CU 300 itself are used to generate (by using a linear model generator 320) a second, refined chroma prediction model having parameters a' and b' for each chroma component Cr/Cb. The video encoder computes their differences to generate refinement Aa and Ab for each chroma component, which are to be signaled to a decoder.

FIG. 3B shows, when decoding the CU 300, the decoder uses reconstructed luma and chroma samples in the neighboring regions of the CU 300 to generate (by using a linear model generator 330) the same first chroma prediction model having parameters a and b for each chroma component Cr/Cb. The decoder receives the refinement of the model parameters Aa and Ab and add them to the parameters a and b first model to recreate the refined chroma prediction model with parameters a' and b' for each chroma component. The decoder then uses the refined model to perform chroma prediction (at a chroma predictor 340) for the CU 300 by applying the model parameters a' and b' to the reconstructed luma samples of the CU 300 to recreate the samples of each chroma component Cr/Cb (by e.g., generating a chroma prediction and adding a chroma prediction residual.)

In some embodiments, only refinement for the scaling parameter a (i.e., Aa) is signaled to the decoder, while the offset parameter b is derived at the decoder (with or without refinement). In some embodiments, refinements for both a and b are signaled for one or both chroma (Cb and Cr) components. In some embodiment, only one refinement for scaling parameter a is signaled for both chroma components (Cr and Cb), and offset parameter b is implicitly defined for each chroma component separately (with or without refinement). In some embodiments, an additional sign (positive/negative) for the refinement of parameter a is coded for one or both chroma (Cb/Cr) components (e.g., need at most 2 bins in context coding for the signs of both chroma components).

In some embodiments, separate refinements for scale and offset (a and b) are coded for different sub-regions of the CU, or that refinement for scale and offset is applicable to only one or some sub-regions of the CU while other sub-regions of the CU do not refine scale and offset parameters (i.e., use only a and b that are derived from neighboring or boundary regions). In some embodiments, such refinements are also sent for additional parameters when a higher (order) model (e.g., a polynomial with higher order than eq. (1)) or multiple models (e.g., multiple different linear models or polynomials) are used to perform chroma prediction, such that the refinement may include adjustment for more than two parameters (at least one more parameter in addition to parameters a and b.) In some embodiments, a band offset is signaled rather than a delta or difference of the scale parameter a.

III. Signaling Chroma Prediction Modes

In some embodiments, CCLM-related syntax, such as flags to select among different CCLM modes (LM-T/LM-L/LM-LT), are signaled or implicitly derived according to characteristics of the current CU and/or its neighbors.

For example, in some embodiments, CCLM-related syntax reordering is performed based on CU size, such that CCLM-related syntax has a signaling method for large CUs that is different than for small CUs. Reordering of CCLM-related syntax is performed because CCLM chroma prediction is assumed to have more benefit for large CUs than for small CUs. Thus, to improve the coding gain of CCLM, CCLM syntax is moved to the front for large CUs and moved to further back or not changed for small CUs.

In some embodiments, CCLM syntax is different for large CUs (e.g., if both width and height of the CU are ≥64) than for small CUs. In other words, a different signaling method is used for CCLM mode for large CUs. Thus, for example, if a CU is larger than a threshold size, then a CCLM-related syntax (e.g., enabling CCLM, selection of chroma prediction model, or model parameter refinements) is signaled before a particular non-CCLM parameter or syntax element is signaled for the CU; conversely, if the CU is smaller than the threshold size, then the CCLM-related syntax is signaled after the particular non-CCLM parameter or syntax element.

In some embodiments, the following candidate modes exist for chroma prediction: Planar, Ver, Hor, DC, DM, LM-L, LM-T, LM-LT. In some embodiments, the list of candidate modes for chroma prediction are reordered (or candidate modes are assigned reordered indices) according to CCLM information. In some embodiments, luma L-neighbor and/or chroma L-neighbor and/or luma reconstructed block information is used during reordering of the chroma prediction candidate modes in the list. This reordering may help to save bits needed for transmission of the index bits and improve coding gain. For example, in some embodiments, chroma prediction obtained by the CCLM mode is compared with chroma predictions (of the current CU) obtained by other chroma prediction modes. The candidate list of chroma prediction modes is then reordered based on the results of such comparison, and the modes providing better prediction are moved to the front of the chroma prediction candidate list (e.g., similar to merge-candidate-reordering). For example, if the luma reconstruction of the CU is "flat", the DC mode may be moved to the front of the chroma prediction candidate list (i.e., assigned an index that correspond to the front of the candidate list).

In some embodiments, there is an indicator sent to the decoder for CCLM that identifies which of the LM-L, LM-T, LM-LT modes is chosen at the encoder. In some embodiments, to save bits spent on identifying the chosen mode, the LM-L, LM-T, LM-LT flag are implicitly derived at the decoder.

In some embodiments, chroma L-shape discontinuity of the CU between the prediction and L-shape is used to select among the LM-L/LM-T/LM-LT modes for large CUs. This also reduces the amount of information to be signaled. Chroma L-shape discontinuity measures discontinuity between the current prediction (i.e., the predicted chroma samples within the current block or CU) and the neighboring reconstruction (e.g., the reconstructed chroma samples within one or more neighboring blocks or CUs). The L-shape discontinuity measurement includes top boundary matching and/or left boundary matching.

Figure 4:
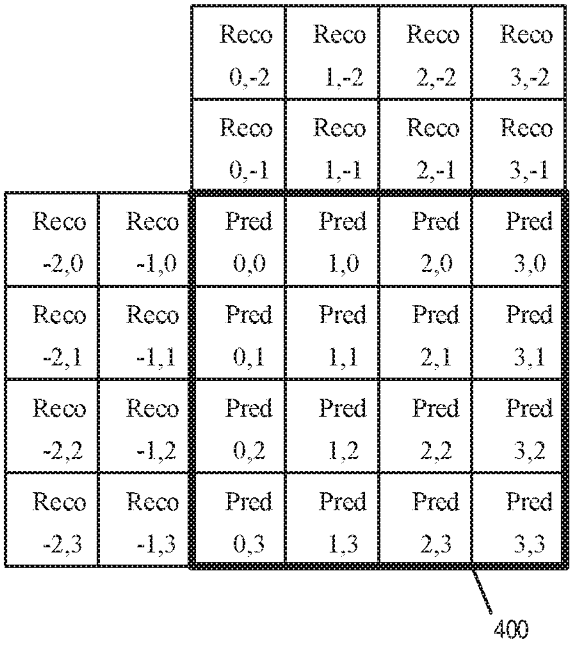
FIG. 4 illustrates samples that are involved in boundary matching for determining L-shaped discontinuity of a coding unit (CU).

FIG. 4 illustrates samples that are involved in boundary matching for determining L-shaped discontinuity of a CU 400. In the figure, predicted samples in the CU 400 are labeled as "Pred" and reconstructed samples neighboring the CU 400 are labeled as "Reco". Top boundary matching refers to the comparison between the current top predicted samples (e.g., 0,0; 1,0; 2,0; 3,0) and the neighboring top reconstructed samples (e.g., 0,−1; 1,−1; 2,−1; 3,−1). Left boundary matching refers to the comparison between the current left predicted samples (e.g., 0,0; 0,1; 0,2; 0,3) and the neighboring left reconstructed samples (e.g., −1,0; −1,1; −1,2; −1,3).

In some embodiments, the predicted chroma is initially obtained using all three CCLM modes (LM-L, LM-T, LM-LT). The predicted chroma samples of each CCLM mode are compared with the chroma samples at the L-shape at the border (L-neighbor), to check the L-shape discontinuity. The mode providing the chroma prediction with the smallest discontinuity is chosen at the decoder. In some embodiments, if the chroma prediction results in discontinuity that is larger than a threshold, the chroma prediction is discarded.

In some embodiment, LM-L mode or LM-T mode are implicitly chosen based on luma intra angle information. In some embodiments, the luma intra angle information is available for selecting a CCLM mode when the CU is intra-coded and that the direction of the intra coding is signaled or implied. In some embodiments, if the luma intra prediction angle direction is from top-left to the bottom-left (indicating that the top neighboring samples are better predictors than left neighboring samples), then the LM-T mode is implicitly chosen. In some embodiments, if luma intra prediction direction is from bottom-left to the top-right (indicating that the left neighboring samples are better predictors than top neighboring samples), then the LM-L mode is implicitly chosen.

In some embodiments, the decoder selects one of LM-L, LM-T, and LM-LT modes (by e.g., setting or defining flags) based on the neighboring splitting information. For example, in some embodiments, if the left neighboring CU is split/partitioned into small CUs, then the coded frame may have more details in that area and the decoder may discard the LM-L mode. As another example, in some embodiments, if neighboring samples at one side of the CU belong to a same CU, then this side is deemed more reliable so the corresponding CCLM mode that refers to that side (LM-T if the top side or LM-L if the left side) is selected.

It is observed that for some large CUs, it is not optimal to use all neighboring samples for the CCLM process. Thus, in some embodiments, the video coder uses only a subset of the neighboring samples for deriving CCLM model parameters (a and b). In some embodiments, for a large CU, the neighboring samples are partitioned into sections, and the sections to be used for corresponding CCLM modes (LM-L/LM-T/LM-LT) are implicitly decided. In some embodiments, for a large CU, different CCLM models are computed and used for chroma prediction of different parts of the CU using different sections of the neighboring samples. For example, for the top-left part of the CU, LM-LT mode is used (to construct the chroma prediction model). For the top-right part of the CU, LM-T mode is used, etc. In some embodiments, for a CU having width much greater than height (W>>H), for the left part of the CU, LM-LT mode is used, and for the right part of the CU, LM-T mode is used.

Figure 5A:
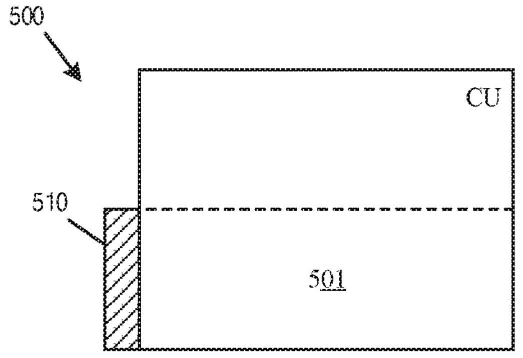
FIGS. 5A-5C illustrates the partitioning of neighboring samples into sections for CCLM modes for a large CU.
Figure 5B:
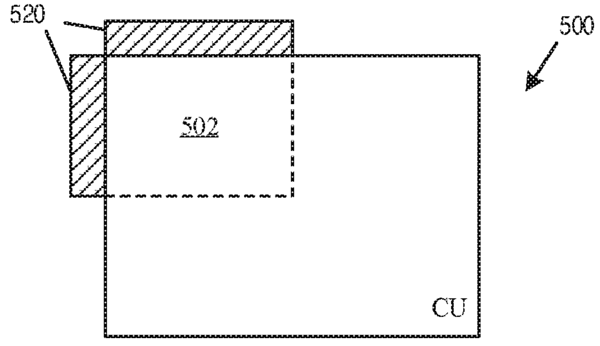
Figure 5C:
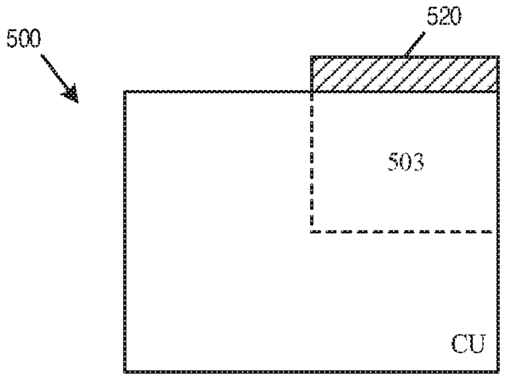

FIGS. 5A-5C illustrates the partitioning of neighboring samples into sections for CCLM modes for a large CU 500. For different parts of the CU 500, different sections of neighboring samples are used for (calculating model parameters of) different CCLM modes. FIG. 5A shows a section 510 of neighboring samples that are used for calculating model parameters of LM-L mode and used for chroma prediction of a bottom part 501 of the CU 500. FIG. 5B shows a section 520 of neighboring samples (L-shaped region) that is used for calculating model parameters of LM-LT mode and used for chroma prediction of a top-left part 502 of the CU 500. FIG. 5C shows a section 530 of neighboring samples that is used for calculating model parameters of LM-T mode and used for chroma prediction of a top-right part 503 of the CU 500.

In some embodiments, the number of LM modes is reduced implicitly. In some embodiments, one LM mode out of the three (LM-T/LM-L/LM-LT) is removed, by analyzing model parameters of the LM modes. In some embodiments, if the model parameters of one LM mode are very different from that of the other two LM modes, this "outlier" LM mode is discarded and not considered for this CU. In this case, it is possible to reduce signaling overhead for the discarded LM mode. In some embodiments, (at least) one of the three LM modes is always discarded.

In some embodiments, multiple chroma prediction models (based on different CCLM modes LM-T/LM-L/LM-LT) for chroma prediction are defined for one CU, and weighted blending is applied to all chroma predictions obtained by those models of different CCLM modes when predicting each final sample of the current CU. In some embodiments, the blending weights are determined based on the distance between the sample and the boundary/top-left point of the CU.

In some embodiments, for a sample that is closer to the left boundary of the CU, the weighting for the model of the LM-L mode will be higher; and if the sample is closer to the top boundary of the CU, then the weighting for model of the LM-LT mode or the model of the LM-T mode will be higher.

In some embodiments, similar to sample adaptive offset (SAO) or adaptive loop filter (ALF), each sample/block of the CU is categorized into different classes and different LM models are applied to (e.g., used for chroma prediction of) different classes of samples/blocks. In some embodiments, classification of a sample is performed based on the distance of the sample from the boundary/top-left point of the CU.

In some embodiments, LM model selection is performed based on the boundary matching condition (for example, cost) or boundary smoothness condition. Specifically, inner prediction (e.g., chroma prediction of a CU or a part of the CU) obtained by each model (e.g., of LM-L/T/LT modes) is compared with the samples in the L-shaped boundary pixels. In some embodiments, the linear model that provides an inner chroma prediction that is closest to the samples in the boundary L-shape is selected. In some embodiments, the boundary smoothness condition of each LM model is determined by matching the chroma samples (inner prediction) predicted by the LM model with samples in the top and/or left boundaries. The LM model that provides the best prediction according to the boundary smoothness condition is selected and used to predict the chroma samples. In some embodiments, the boundary matching cost or boundary smoothness condition for a LM mode refers to the difference measurement between the inner chroma prediction and the corresponding adjacent neighboring chroma reconstruction (e.g., the reconstructed samples within one or more neighboring blocks). The difference measurement may be based on top boundary matching and/or left boundary matching. The difference measurement based on top boundary matching is the difference (e.g., SAD) between the inner predicted samples at the top of the current block and the corresponding neighboring reconstructed samples adjacent to the top of the current block. The difference measurement based on left boundary matching is the difference (e.g., SAD) between the inner predicted samples at the left of the current block and the corresponding neighboring reconstructed samples adjacent to the left of the current block.

In some embodiments, a CU is divided into sub-CUs and CCLM is applied to each sub-CU separately. Sub-CU based CCLM may help improve the accuracy of chroma prediction since for large CUs, the distance from the boundary pixels to some of the internal pixels may be too large. In some embodiment, CCLM is applied to a first sub-CU using left boundary and elements from the part of the top boundary that is adjacent to only this sub-CU and no other sub-CUs. For a second sub-CU, elements from the left boundary and part of the top boundary that is adjacent to only this sub-CU are used to define the CCLM model parameters, and the defined model is applied only to this sub-CU.

Figure 6:
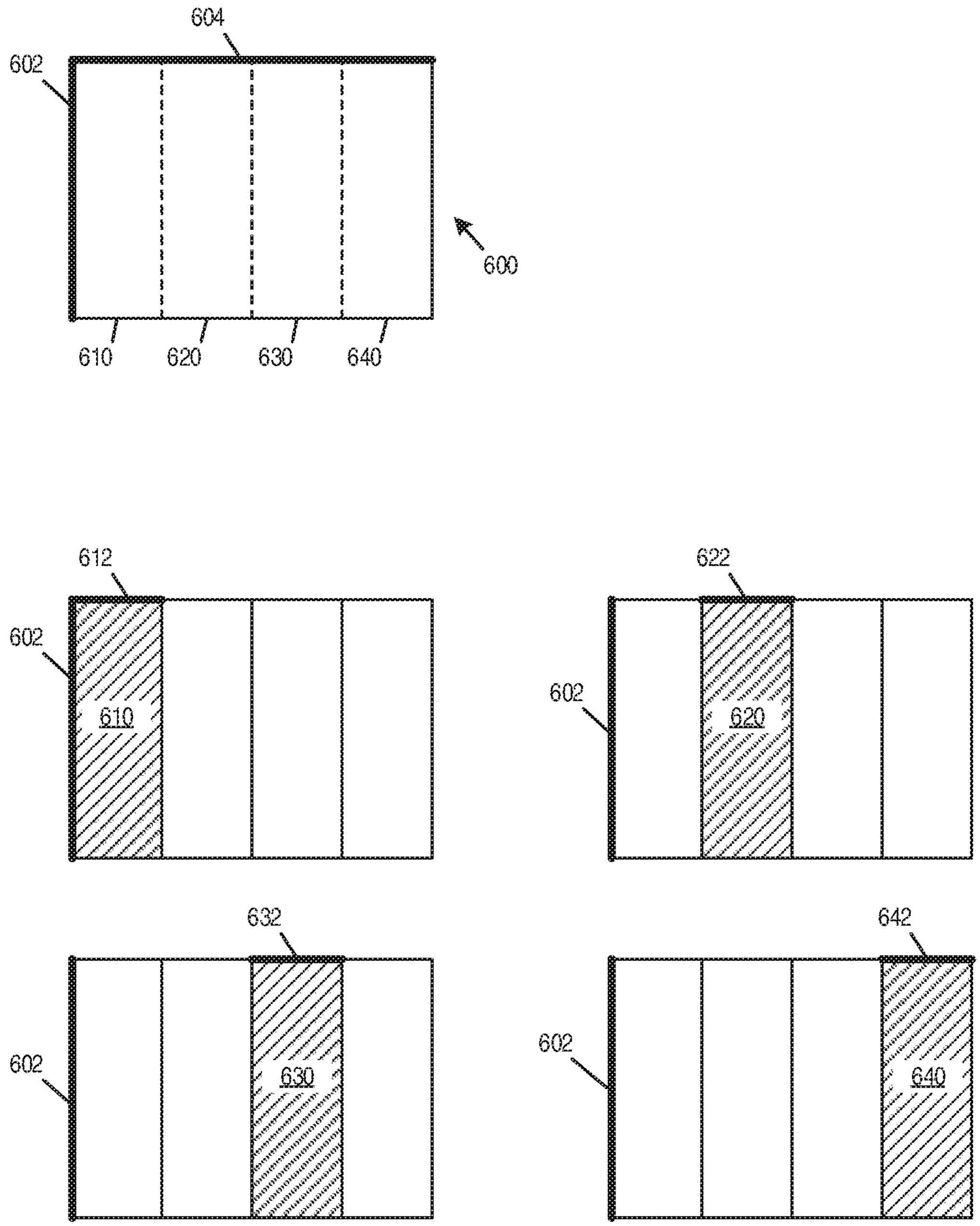
FIG. 6 conceptually illustrates chroma prediction of individual sub-CUs based on the boundaries of the CU.

FIG. 6 conceptually illustrates chroma prediction of individual sub-CUs based on the boundaries of the CU. The figure illustrates a CU 600 having sub-CUs 610, 620, 630, 640. The CU has a left boundary 602 and a top boundary 604 having four sections 612, 622, 632, 642 that are respectively adjacent to the sub-CUs 610, 620, 630, and 640. The left boundary 602 and the top boundary section 612 directly above the sub-CU 610 (and no other sub-CU) are used to derive the LM model for predicting chroma of sub-CU 610. The left boundary 602 and a top boundary section 622 directly above the sub-CU 620 (and not any other sub-CU) are used to derive the LM model for predicting chroma of sub-CU 620. The left boundary 602 and a top boundary section 632 directly above the sub-CU 630 are used to derive the LM model for predicting chroma of the sub-CU 630. The left boundary 602 and a top boundary section 642 directly above the sub-CU 640 are used to derive the LM model for predicting chroma of sub-CU 640.

In some embodiments, CCLM is applied to each sub-CU one after another, and the samples used for determining the LM model parameters are taken from previously reconstructed samples of the adjacent sub-CU. Thus, for each next sub-CU elements, the left (or top) boundary of the CU is replaced by the previously reconstructed samples of the adjacent sub-CU to the left (or above).

Figure 7:
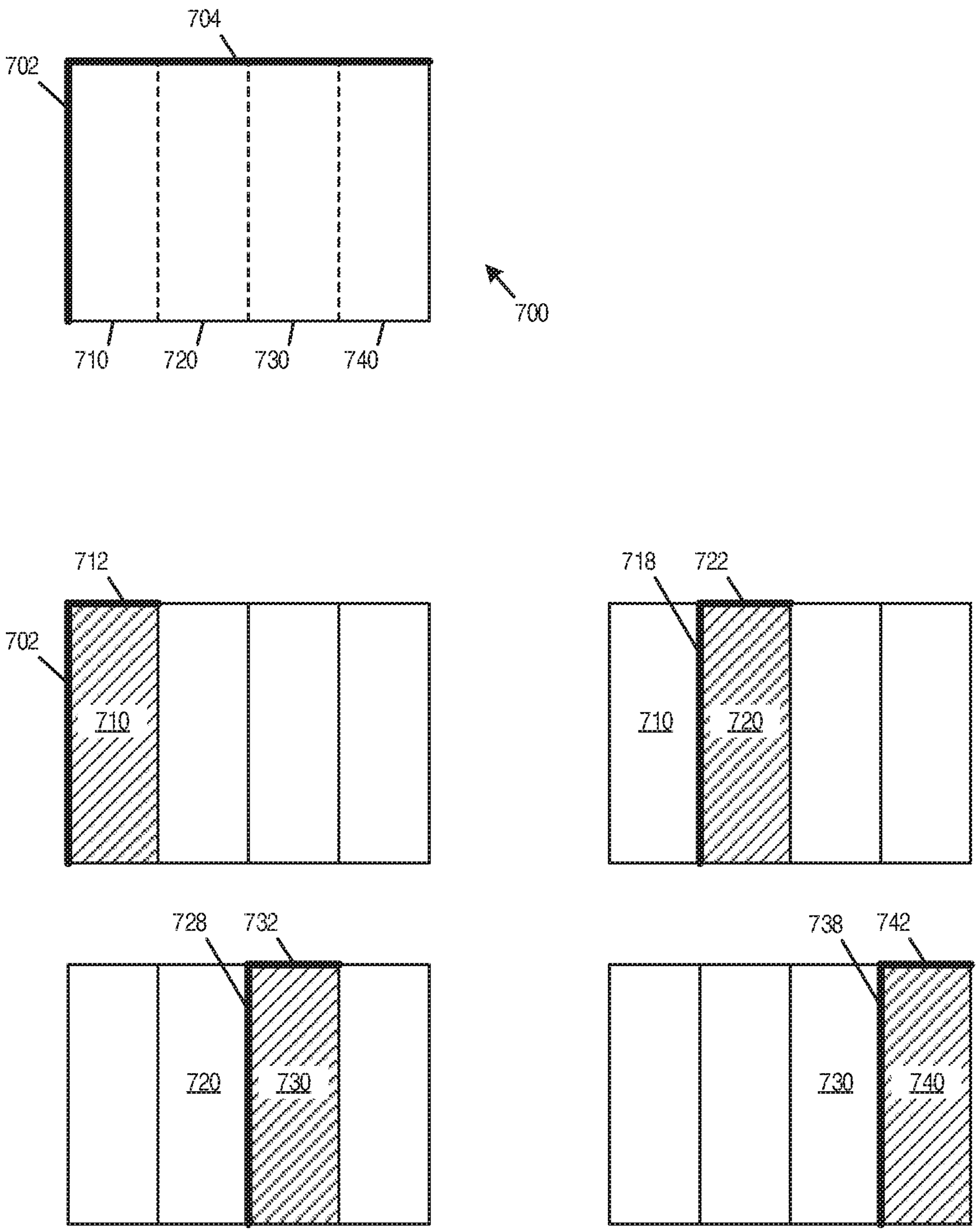
FIG. 7 conceptually illustrates chroma prediction of successive sub-CUs based on the boundaries with previously reconstructed sub-CUs.

FIG. 7 conceptually illustrates chroma prediction of successive sub-CUs based on the boundaries with previously reconstructed sub-CUs. The figure illustrates a CU 700 that is partitioned into sub-CUs 710, 720, 730, and 740 that are successively coded and reconstructed. The CU 700 has a left boundary 702 and a top boundary 704 having four sections 712, 722, 732, 20) 742 that are respectively adjacent to the sub-CUs 710, 720, 730, and 740. When performing chroma prediction for the sub-CU 710, the left boundary 702 and the top boundary section 712 are used to derive the LM parameters.

When performing chroma prediction for the sub-CU 720, instead of the left boundary 702, the reconstructed samples at the sub-CU boundary 718 (in the sub-CU 710 and adjacent to the sub-CU 720) is used to derive the LM parameters. Likewise, when performing chroma prediction for the sub-CU 730, instead of the left boundary 702, the reconstructed samples at the sub-CU boundary 728 (in the sub-CU 720 and adjacent to the sub-CU 730) is used to derive the LM parameters. This may result in a sequential latency for encoding or decoding the CU, since for the reconstruction of each sub-CU requires the reconstruction of all previous sub-CUs in the CU.

IV. Example Video Encoder

Figure 8:
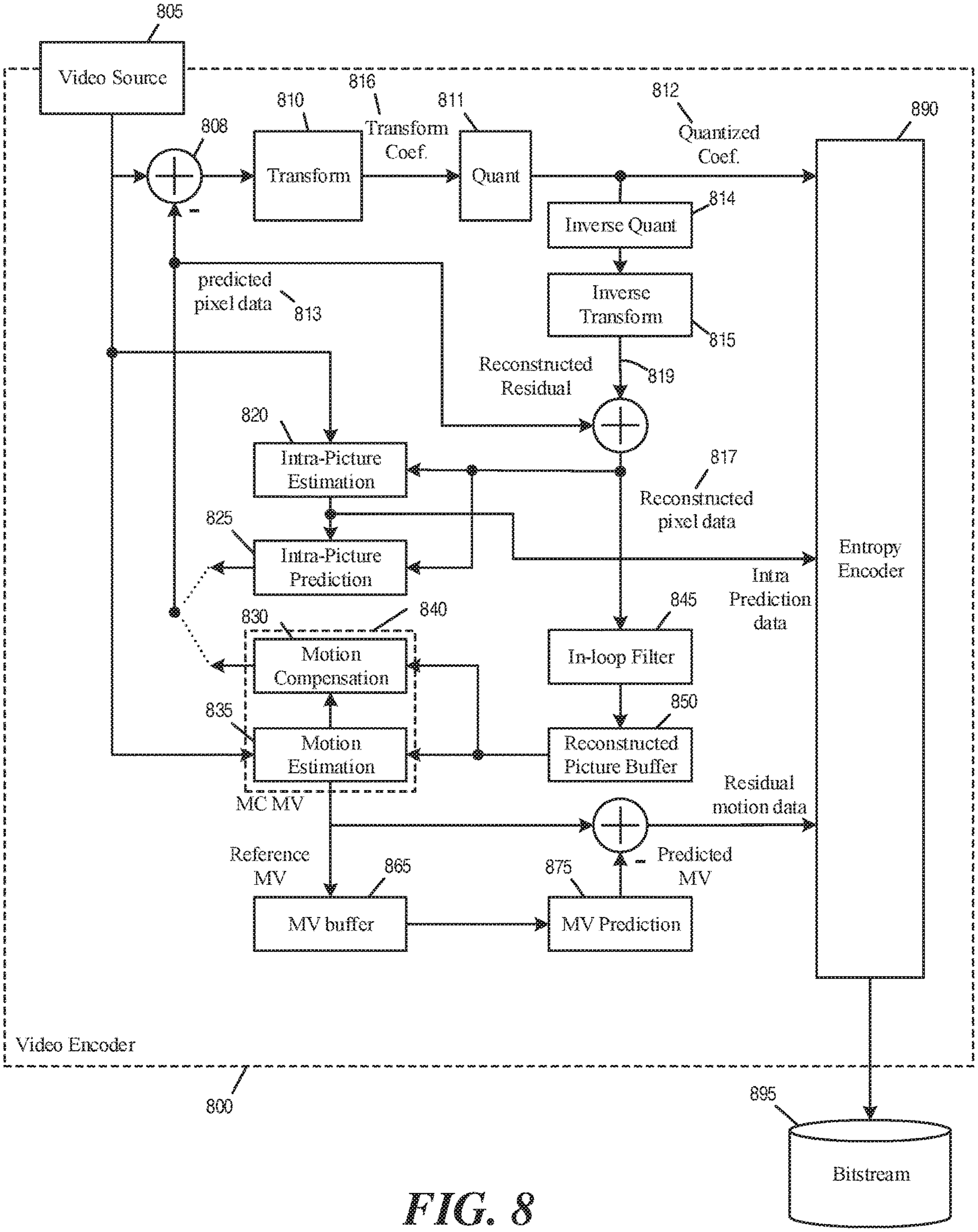
FIG. 8 illustrates an example video encoder that may perform chroma prediction.

FIG. 8 illustrates an example video encoder 800 that may perform chroma prediction. As illustrated, the video encoder 800 receives input video signal from a video source 805 and encodes the signal into bitstream 895. The video encoder 800 has several components or modules for encoding the signal from the video source 805, at least including some components selected from a transform module 810, a quantization module 811, an inverse quantization module 814, an inverse transform module 815, an intra-picture estimation module 820, an intra-prediction module 825, a motion compensation module 830, a motion estimation module 835, an in-loop filter 845, a reconstructed picture buffer 850, a MV buffer 865, and a MV prediction module 875, and an entropy encoder 890. The motion compensation module 830 and the motion estimation module 835 are part of an inter-prediction module 840.

In some embodiments, the modules 810-890 are modules of software instructions being executed by one or more processing units (e.g., a processor) of a computing device or electronic apparatus. In some embodiments, the modules 810-890 are modules of hardware circuits implemented by one or more integrated circuits (ICs) of an electronic apparatus. Though the modules 810-890 are illustrated as being separate modules, some of the modules can be combined into a single module.

The video source 805 provides a raw video signal that presents pixel data of each video frame without compression. A subtractor 808 computes the difference between the raw video pixel data of the video source 805 and the predicted pixel data 813 from the motion compensation module 830 or intra-prediction module 825. The transform module 810 converts the difference (or the residual pixel data or residual signal 808) into transform coefficients (e.g., by performing Discrete Cosine Transform, or DCT). The quantization module 811 quantizes the transform coefficients into quantized data (or quantized coefficients) 812, which is encoded into the bitstream 895 by the entropy encoder 890.

The inverse quantization module 814 de-quantizes the quantized data (or quantized coefficients) 812 to obtain transform coefficients, and the inverse transform module 815 performs inverse transform on the transform coefficients to produce reconstructed residual 819. The reconstructed residual 819 is added with the predicted pixel data 813 to produce reconstructed pixel data 817. In some embodiments, the reconstructed pixel data 817 is temporarily stored in a line buffer (not illustrated) for intra-picture prediction and spatial MV prediction. The reconstructed pixels are filtered by the in-loop filter 845 and stored in the reconstructed picture buffer 850. In some embodiments, the reconstructed picture buffer 850 is a storage external to the video encoder 800. In some embodiments, the reconstructed picture buffer 850 is a storage internal to the video encoder 800.

The intra-picture estimation module 820 performs intra-prediction based on the reconstructed pixel data 817 to produce intra prediction data. The intra-prediction data is provided to the entropy encoder 890 to be encoded into bitstream 895. The intra-prediction data is also used by the intra-prediction module 825 to produce the predicted pixel data 813.

The motion estimation module 835 performs inter-prediction by producing MVs to reference pixel data of previously decoded frames stored in the reconstructed picture buffer 850. These MVs are provided to the motion compensation module 830 to produce predicted pixel data.

Instead of encoding the complete actual MVs in the bitstream, the video encoder 800 uses MV prediction to generate predicted MVs, and the difference between the MVs used for motion compensation and the predicted MVs is encoded as residual motion data and stored in the bitstream 895.

The MV prediction module 875 generates the predicted MVs based on reference MVs that were generated for encoding previously video frames, i.e., the motion compensation MVs that were used to perform motion compensation. The MV prediction module 875 retrieves reference MVs from previous video frames from the MV buffer 865. The video encoder 800 stores the MVs generated for the current video frame in the MV buffer 865 as reference MVs for generating predicted MVs.

The MV prediction module 875 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 895 by the entropy encoder 890.

The entropy encoder 890 encodes various parameters and data into the bitstream 895 by using entropy-coding techniques such as context-adaptive binary arithmetic coding (CABAC) or Huffman encoding. The entropy encoder 890 encodes various header elements, flags, along with the quantized transform coefficients 812, and the residual motion data as syntax elements into the bitstream 895. The bitstream 895 is in turn stored in a storage device or transmitted to a decoder over a communications medium such as a network.

The in-loop filter 845 performs filtering or smoothing operations on the reconstructed pixel data 817 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 9:
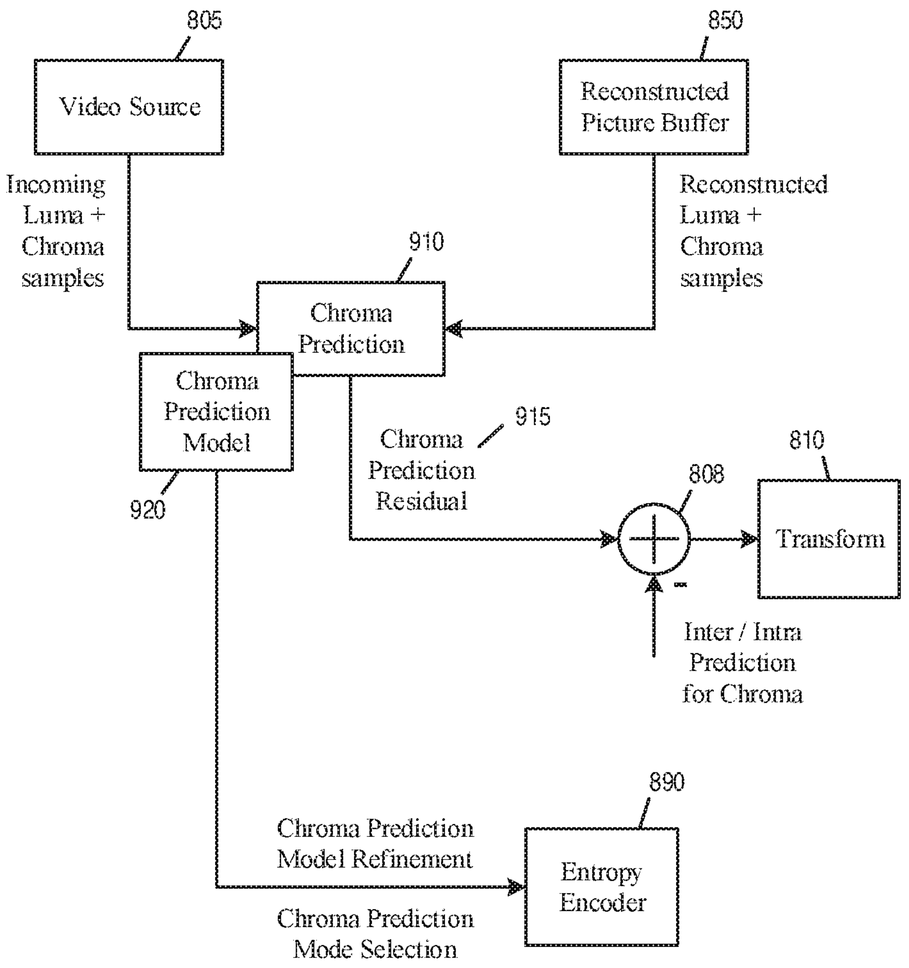
FIG. 9 illustrates portions of the video encoder that implement chroma prediction.
Figure 9:
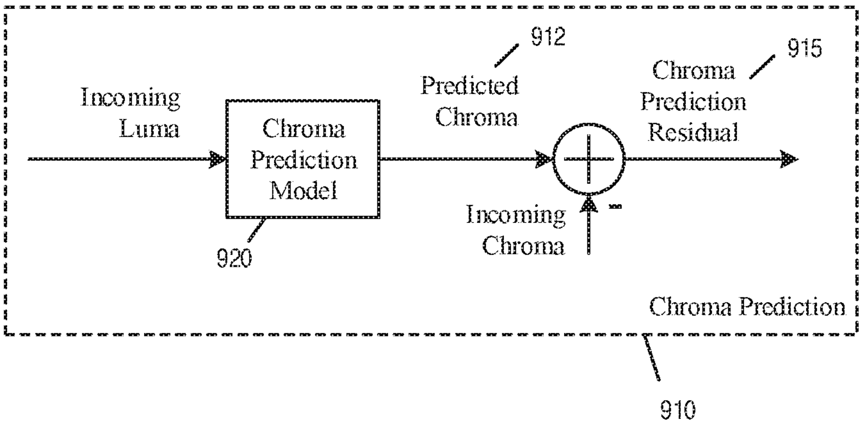

FIG. 9 illustrates portions of the video encoder 800 that implement chroma prediction. As illustrated, the video source 805 provides incoming luma and chroma samples, while the reconstructed picture buffer 850 provides reconstructed luma and chroma samples. The incoming and reconstructed luma and chroma samples are processed by a chroma prediction module 910, which uses corresponding luma samples and chroma samples to generate predicted chroma samples 912 and corresponding chroma prediction residual signal 915. The chroma prediction residual signal 915 is encoded (transformed, inter/intra predicted, etc.) in place of regular chroma samples.

The chroma prediction module 910 uses a chroma prediction model 920 to produce the predicted chroma samples 912 based on incoming luma samples. The predicted chroma samples 912 are used to produce the chroma prediction residual 915 by subtracting the incoming chroma samples. The chroma prediction module 910 also generates the chroma prediction model 920 based on the chroma and luma samples received from the video source 805 and the reconstructed picture buffer 850. Section I above describes using luma and chroma samples of reconstructed neighbors to create the chroma prediction model. The parameters of the chroma prediction model 920 (a and b) may be refined by adjustment to the parameters (Aa and/or Δb). FIG. 3A above describes a video encoder using reconstructed luma and chroma samples to create a first chroma prediction model and using incoming luma and chroma samples to create a second, refined chroma prediction model. The parameters of the chroma prediction model 920 (a and/or b) and/or refinement of the parameters (Aa and/or Δb) are provided to the entropy encoder 890. The entropy encoder 890 may in turn signal the chroma prediction model parameters or the refinement to decoder. The signaling of chroma prediction model parameters is described in Section II above.

For each CU or sub-partition of the CU, one of several different chroma prediction modes (LM-T/LM-L/LM-LT) may be selected as the basis for constructing the chroma prediction model 920. The selection of the chroma prediction mode for a CU or sub-CU may be provided to the entropy encoder 890 to be signaled to the decoder. The selection of the chroma prediction mode may also be implicit (not signaled to the decoder) based on characteristics of the CU such as luma intra angle information, L-shape discontinuity, neighboring block splitting information, or CU size/width/height information. The entropy encoder 890 may also reorder chroma prediction (CCLM) related syntax based on the characteristics of the CU. The entropy encoder 890 may also reorder the different chroma prediction modes (by e.g., assigning reordered indices) based on a comparison of the chroma predictions obtained by the different chroma prediction modes, with the 30 measurement of such a comparison provided by the chroma prediction module 910. The signaling and reordering of chroma prediction related syntax is described in Section III above.

Figure 10:
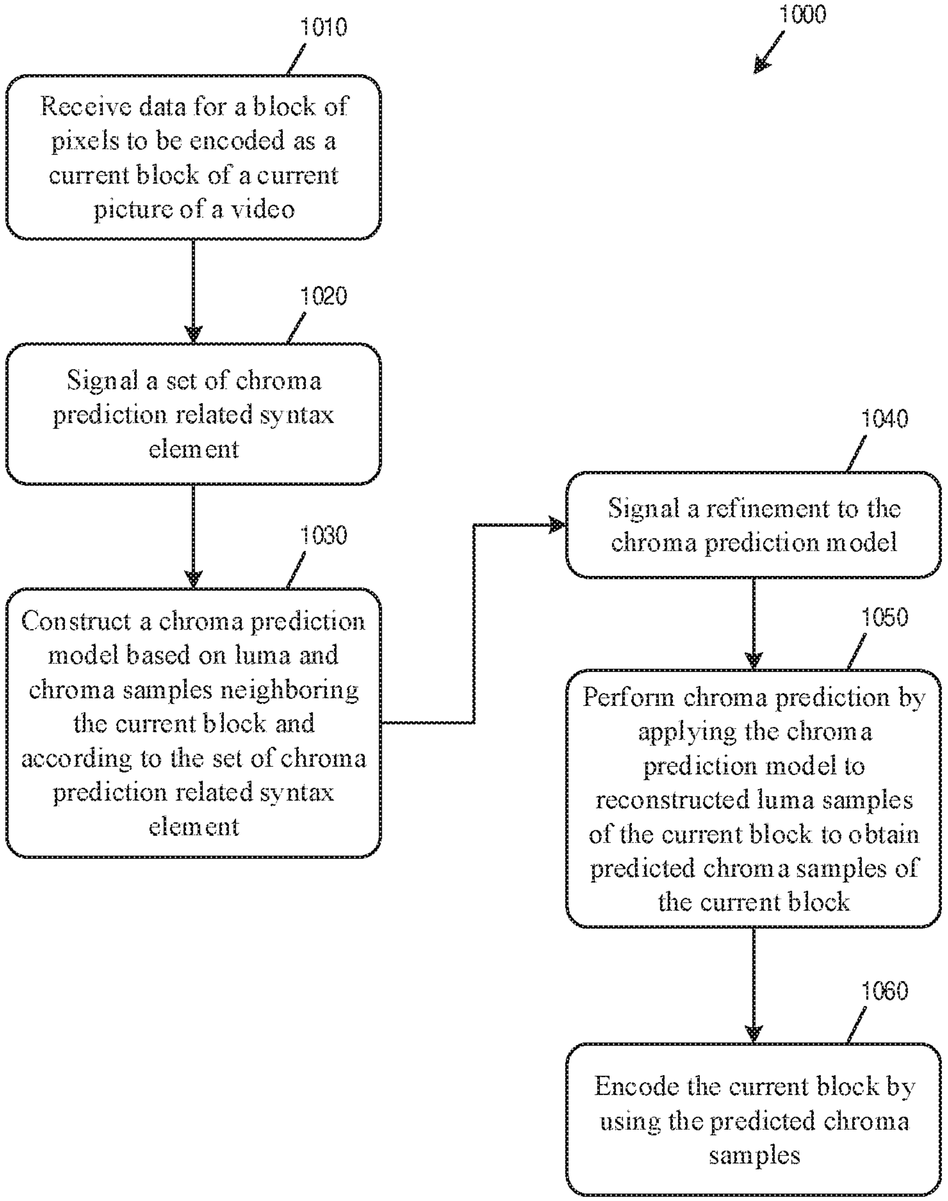
FIG. 10 conceptually illustrates a process for signaling chroma prediction related syntax and parameters and performing chroma prediction.

FIG. 10 conceptually illustrates a process 1000 for signaling chroma prediction related syntax and parameters and performing chroma prediction. In some embodiments, one or more processing units (e.g., a processor) of a computing device implementing the encoder 800 performs the process 1000 by executing instructions stored in a computer readable medium. In some embodiments, an electronic apparatus implementing the encoder 800 performs the process 1000.

The encoder receives (at block 1010) data to be encoded as a current block of a current picture of a video. The encoder signals (at block 1020) a set of chroma prediction related syntax element to a video decoder. In some embodiments, different signaling methods are used to signal the set of chroma prediction related syntax elements for when the current block is greater than or equal to a threshold size and for when the current block is smaller than a threshold size.

The encoder constructs (at block 1030) a chroma prediction model based on luma and chroma samples neighboring the current block. The chroma prediction model is constructed according to the set of chroma prediction related syntax elements. In some embodiments, the chroma prediction model has a set of model parameters that includes a scaling parameter a and an offset parameter b.

In some embodiments, the set of chroma prediction related syntax elements may select one of multiple different chroma prediction modes (e.g., LM-T/LM-L/LM-LT) that refer to different regions neighboring the current block, and the chroma prediction model is constructed according to the selected chroma prediction mode. A list of candidates that includes the multiple different chroma prediction modes may be reordered based on a comparison of the chroma predictions obtained by the different chroma prediction modes.

In some embodiments, one of the multiple chroma prediction modes is chosen as the selected chroma prediction mode based on a luma intra angle information of the current block. In some embodiments, one of the multiple chroma prediction modes is chosen as the selected chroma prediction mode based on discontinuity measurement between predicted chroma samples of the current block and reconstructed chroma samples of a neighboring region (e.g., L-shape) of the current block. In some embodiments, one of the multiple chroma prediction modes is chosen as the selected chroma prediction mode based on a splitting information of a neighboring block. In some embodiments, one of the multiple chroma prediction modes is chosen as the selected chroma prediction mode based on a size, a width, or a height of the current block. In some embodiments, chroma prediction models constructed according to different chroma prediction modes are used to perform chroma prediction for different sub-regions of the current block.

The encoder signals (at block 1040) a refinement to the chroma prediction model to a video decoder. The refinement is determined according to luma and chroma samples inside the current block. The refinement to the chroma prediction model may include an adjustment to the scaling parameter (Δa) and an adjustment to the offset parameter (Δb). The signaled refinement may also include a sign of the adjustment to the scaling parameter of at least one chroma component.

In some embodiments, the signaled refinement includes adjustments to the scaling parameter but not the offset parameter of each chroma component. The signaled refinement may include one adjustment that is applicable to the scaling parameters of both chroma components, while the offset parameter of each chroma component is implicitly adjusted at the video decoder. In some embodiments, the signaled refinement includes adjustment to the model parameters (a and b) of a first chroma component but no adjustment to the model parameters of a second chroma component.

In some embodiments, the signaled refinement is applicable to only a sub-region of the current block, wherein separate refinements for scaling and offset parameters are coded and signaled for different regions of the current block. In some embodiments, the chroma prediction model is one of multiple chroma prediction models applied to the reconstructed luma samples of the current block to obtain the predicted chroma samples of the current block, and the signaled refinement includes adjustment to the model parameters of the multiple chroma prediction models.

The encoder performs (at block 1050) chroma prediction by applying the chroma prediction model to reconstructed luma samples of the current block to obtain predicted chroma samples of the current block. The encoder encodes (at block 1060) the current block by using the predicted chroma samples. In some embodiments, the predicted chroma samples are used to calculate the residuals of the chroma prediction, and the chroma prediction residuals are transformed and encoded as part of the bitstream or coded video.

V. Example Video Decoder

In some embodiments, an encoder may signal (or generate) one or more syntax element in a bitstream, such that a decoder may parse the one or more syntax element from the bitstream.

Figure 11:
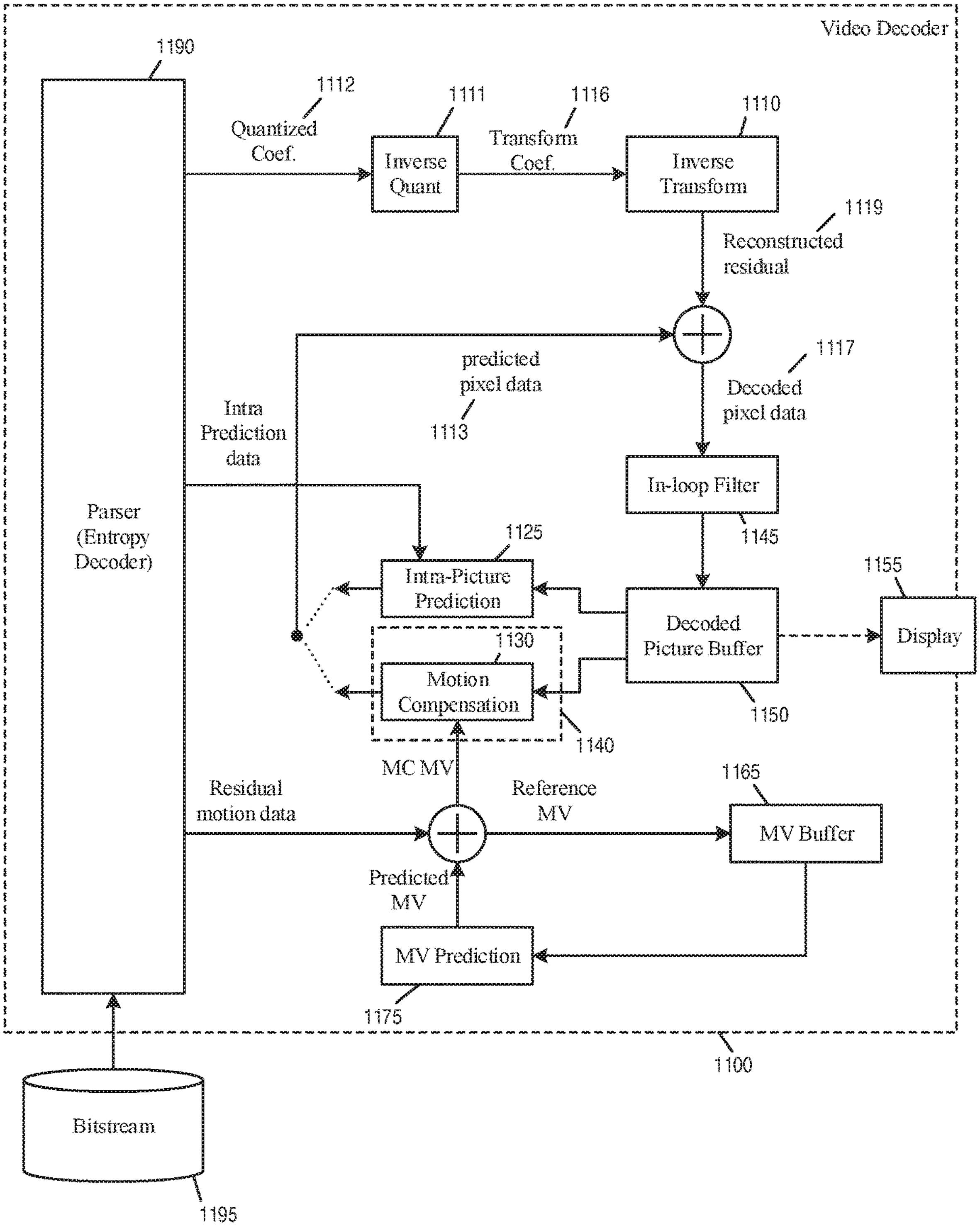
FIG. 11 illustrates an example video decoder that may perform chroma prediction.

FIG. 11 illustrates an example video decoder 1100 that may perform chroma prediction. As illustrated, the video decoder 1100 is an image-decoding or video-decoding circuit that receives a bitstream 1195 and decodes the content of the bitstream into pixel data of video frames for display. The video decoder 1100 has several components or modules for decoding the bitstream 1195, including some components selected from an inverse quantization module 1111, an inverse transform module 1110, an intra-prediction module 1125, a motion compensation module 1130, an in-loop filter 1145, a decoded picture buffer 1150, a MV buffer 1165, a MV prediction module 1175, and a parser 1190. The motion compensation module 1130 is part of an inter-prediction module 1140.

In some embodiments, the modules 1110-1190 are modules of software instructions being executed by one or more processing units (e.g., a processor) of a computing device. In some embodiments, the modules 1110-1190 are modules of hardware circuits implemented by one or more ICs of an electronic apparatus. Though the modules 1110-1190 are illustrated as being separate modules, some of the modules can be combined into a single module.

The parser 1190 (or entropy decoder) receives the bitstream 1195 and performs initial parsing according to the syntax defined by a video-coding or image-coding standard. The parsed syntax element includes various header elements, flags, as well as quantized data (or quantized coefficients) 1112. The parser 1190 parses out the various syntax elements by using entropy-coding techniques such as context-adaptive binary arithmetic coding (CABAC) or Huffman encoding.

The inverse quantization module 1111 de-quantizes the quantized data (or quantized coefficients) 1112 to obtain transform coefficients, and the inverse transform module 1110 performs inverse transform on the transform coefficients 1116 to produce reconstructed residual signal 1119. The reconstructed residual signal 1119 is added with predicted pixel data 1113 from the intra-prediction module 1125 or the motion compensation module 1130 to produce decoded pixel data 1117. The decoded pixels data are filtered by the in-loop filter 1145 and stored in the decoded picture buffer 1150. In some embodiments, the decoded picture buffer 1150 is a storage external to the video decoder 1100. In some embodiments, the decoded picture buffer 1150 is a storage internal to the video decoder 1100.

The intra-prediction module 1125 receives intra-prediction data from bitstream 1195 and according to which, produces the predicted pixel data 1113 from the decoded pixel data 1117 stored in the decoded picture buffer 1150. In some embodiments, the decoded pixel data 1117 is also stored in a line buffer (not illustrated) for intra-picture prediction and spatial MV prediction.

In some embodiments, the content of the decoded picture buffer 1150 is used for display. A display device 1155 either retrieves the content of the decoded picture buffer 1150 for display directly, or retrieves the content of the decoded picture buffer to a display buffer. In some embodiments, the display device receives pixel values from the decoded picture buffer 1150 through a pixel transport.

The motion compensation module 1130 produces predicted pixel data 1113 from the decoded pixel data 1117 stored in the decoded picture buffer 1150 according to motion compensation MVs (MC MVs). These motion compensation MVs are decoded by adding the residual motion data received from the bitstream 1195 with predicted MVs received from the MV prediction module 1175.

The MV prediction module 1175 generates the predicted MVs based on reference MVs that were generated for decoding previous video frames, e.g., the motion compensation MVs that were used to perform motion compensation. The MV prediction module 1175 retrieves the reference MVs of previous video frames from the MV buffer 1165. The video decoder 1100 stores the motion compensation MVs generated for decoding the current video frame in the MV buffer 1165 as reference MVs for producing predicted MVs.

The in-loop filter 1145 performs filtering or smoothing operations on the decoded pixel data 1117 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 12:
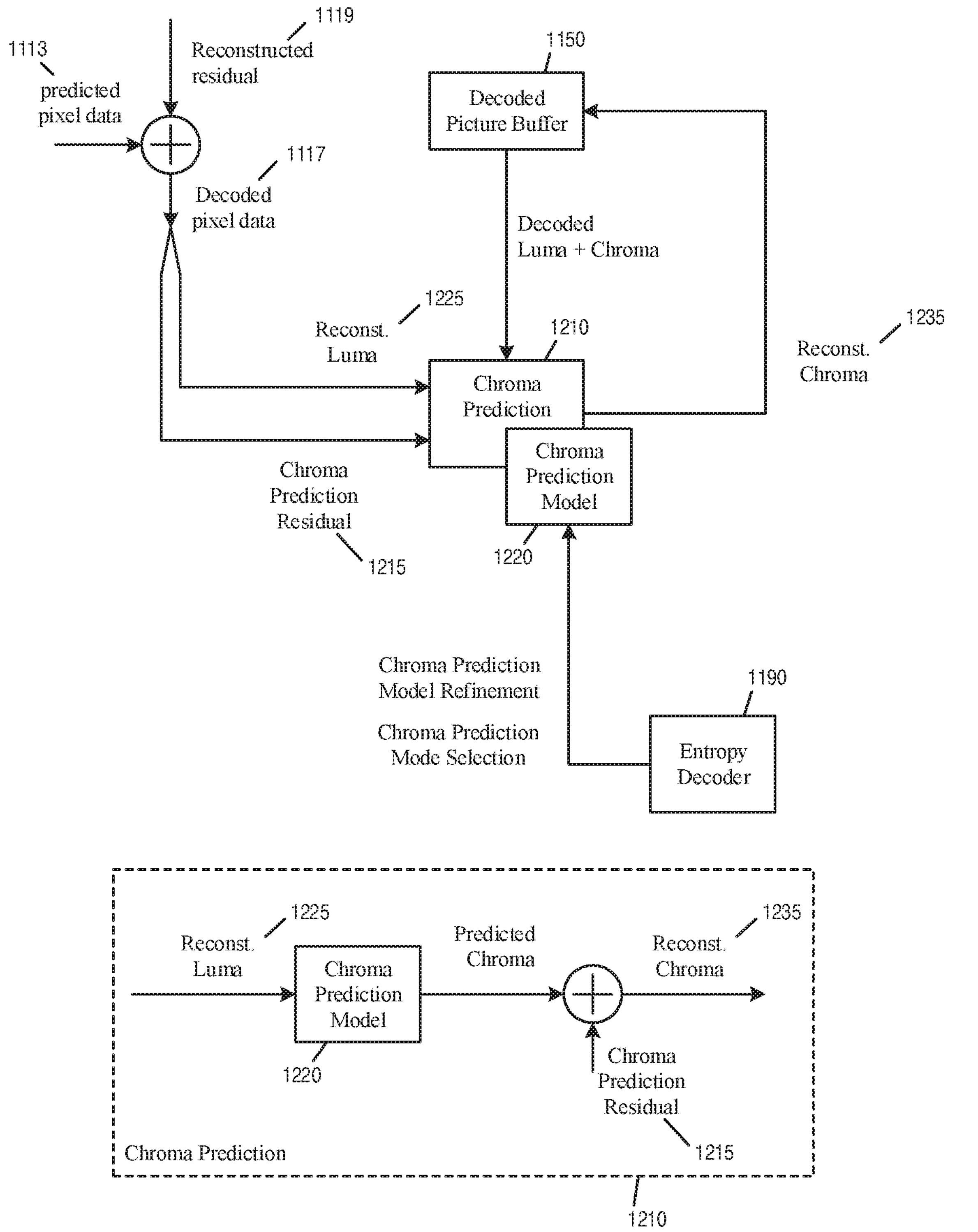
FIG. 12 illustrates portions of the video decoder that implement chroma prediction.

FIG. 12 illustrates portions of the video decoder 1100 that implement chroma prediction. As illustrated, the decoded picture buffer 1150 provides decoded luma and chroma samples to a chroma prediction module 1210, which produced chroma samples for display or output by predicting chroma samples based on luma samples.

The chroma prediction module 1210 receives the decoded pixel data 1117, which includes reconstructed luma samples 1225 and chroma prediction residual 1215. The chroma prediction module 1210 uses a chroma prediction model 1220 to produce the predicted chroma samples based on the reconstructed luma samples 1225. The predicted chroma samples are then added with the chroma prediction residual 1215 to produce the reconstructed chroma samples 1235. The reconstructed chroma samples 1235 are then stored in the decoded picture buffer 1150 for display and for reference.

The chroma prediction module 1210 constructs the chroma prediction model 1220 based on the reconstructed chroma and luma samples. Section I above describes using luma and chroma samples of reconstructed neighbors to create the chroma prediction model. The parameters of the chroma prediction model 1220 (a and b) may be refined by adjustment to the parameters (Δa and/or Δb). FIG. 3B above describes the video decoder using reconstructed luma and chroma samples to create the chroma prediction model and using the refinement to adjust the parameters of the chroma prediction model. The refinement of the model parameters (Aa and/or Δb) are provided by the entropy decoder 1190, which may receive the refinement from a video encoder via the bitstream 1195. The entropy decoder 1190 may also implicitly derive refinements for one of the parameters (e.g., offset parameter b) or for one of the chroma components Cr/Cb. The signaling of chroma prediction model parameters is described in Section II above.

For each CU or sub-partition of the CU, one of several different chroma prediction modes (LM-T/LM-L/LM-LT) may be selected as the basis for constructing the chroma prediction model 1220. The selection of the chroma prediction mode for a CU or sub-CU may be provided by the entropy decoder 1190. The selection may be explicitly signaled in a bitstream by the video encoder. The selection may also be implicit. For example, the entropy decoder 1190 may derive the selection of the chroma prediction mode based on characteristics of the CU such as luma intra angle information, L-shape discontinuity, neighboring block splitting information, or CU size/width/height information. The entropy decoder 1190 may also process chroma prediction (CCLM) related syntax that are reordered based on the characteristics of the CU. The entropy decoder 1190 may also reorder the different chroma prediction modes (by e.g., assigning reordered indices) based on a comparison of the chroma predictions obtained by the different chroma prediction modes, with the measurement of such a comparison provided by the chroma prediction module 1210. The signaling and reordering of chroma prediction related syntax is described in Section III above.

Figure 13:
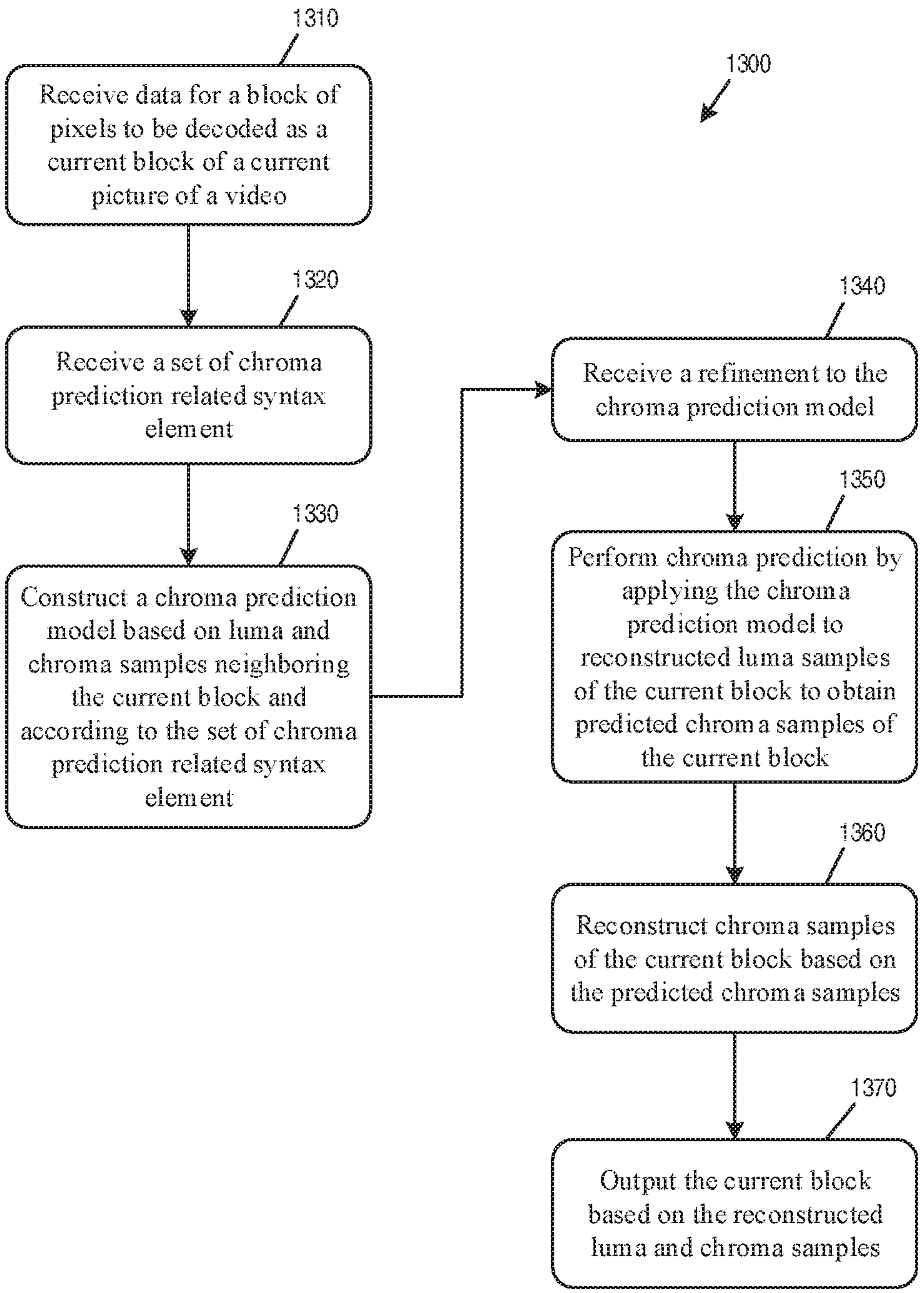
FIG. 13 conceptually illustrates a process for receiving chroma prediction related syntax and parameters and performing chroma prediction.

FIG. 13 conceptually illustrates a process 1300 for receiving chroma prediction related syntax and parameters and performing chroma prediction. In some embodiments, one or more processing units (e.g., a processor) of a computing device implements the decoder 1100 performs the process 1300 by executing instructions stored in a computer readable medium. In some embodiments, an electronic apparatus implementing the decoder 1100 performs the process 1300.

The decoder receives (at block 1310) data to be decoded as a current block of a current picture of a video. The decoder receives (at block 1320) a set of chroma prediction related syntax element that are signaled by a video encoder. In some embodiments, different signaling methods are used to signal the set of chroma prediction related syntax elements for when the current block is greater than or equal to a threshold size and for when the current block is smaller than a threshold size.

The decoder constructs (at block 1330) a chroma prediction model based on luma and chroma samples neighboring the current block. The chroma prediction model is constructed according to the set of chroma prediction related syntax elements. In some embodiments, the chroma prediction model has a set of model parameters that includes a scaling parameter a and an offset parameter b.

In some embodiments, the set of chroma prediction related syntax elements may select one of multiple different chroma prediction modes (e.g., LM-T/LM-L/LM-LT) that refer to different regions neighboring the current block, and the chroma prediction model is constructed according to the selected chroma prediction mode. A list of candidates that includes the multiple different chroma prediction modes may be reordered based on a comparison of the chroma predictions obtained by the different chroma prediction modes.

In some embodiments, one of the multiple chroma prediction modes is chosen as the selected chroma prediction mode based on a luma intra angle information of the current block. In some embodiments, one of the multiple chroma prediction modes is chosen as the selected chroma prediction mode based on discontinuity measurement between predicted chroma samples of the current block and reconstructed chroma samples of a neighboring region (e.g., L-shape) of the current block. In some embodiments, one of the multiple chroma prediction modes is chosen as the selected chroma prediction mode based on a splitting information of a neighboring block. In some embodiments, one of the multiple chroma prediction modes is chosen as the selected chroma prediction mode based on a size, a width, or a height of the current block. In some embodiments, chroma prediction models constructed according to different chroma prediction modes are used to perform chroma prediction for different sub-regions of the current block.

The decoder receives (at block 1340) a signaled refinement to the chroma prediction model to a video decoder. In some embodiments, the refinement is determined by the encoder according to luma and chroma samples inside the current block. The refinement to the chroma prediction model may include an adjustment to the scaling parameter ($\Delta a$) and an adjustment to the offset parameter ($\Delta b$). The signaled refinement may also include a sign of the adjustment to the scaling parameter of at least one chroma component.

In some embodiments, the signaled refinement includes adjustments to the scaling parameter but not the offset parameter of each chroma component. The signaled refinement may include one adjustment that is applicable to the scaling parameters of both chroma components, while the offset parameter of each chroma component is implicitly adjusted at the video decoder. In some embodiments, the signaled refinement includes adjustment to the model parameters (a and b) of a first chroma component but no adjustment to the model parameters of a second chroma component.

In some embodiments, the signaled refinement is applicable to only a sub-region of the current block, wherein separate refinements for scaling and offset parameters are coded and signaled for different regions of the current block. In some embodiments, the chroma prediction model is one of multiple chroma prediction models applied to the reconstructed luma samples of the current block to obtain the predicted chroma samples of the current block, and the signaled refinement includes adjustment to the model parameters of the multiple chroma prediction models.

The decoder performs (at block 1350) chroma prediction by applying the chroma prediction model to reconstructed luma samples of the current block to obtain predicted chroma samples of the current block. The decoder reconstructs (at block 1360) chroma samples of the current block based on the predicted chroma samples (by e.g., adding a chroma prediction residual.) The decoder outputs (at block 1370) the current block based on the reconstructed luma and chroma samples for display as part of the reconstructed current picture.

VI. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, 45 flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 14:
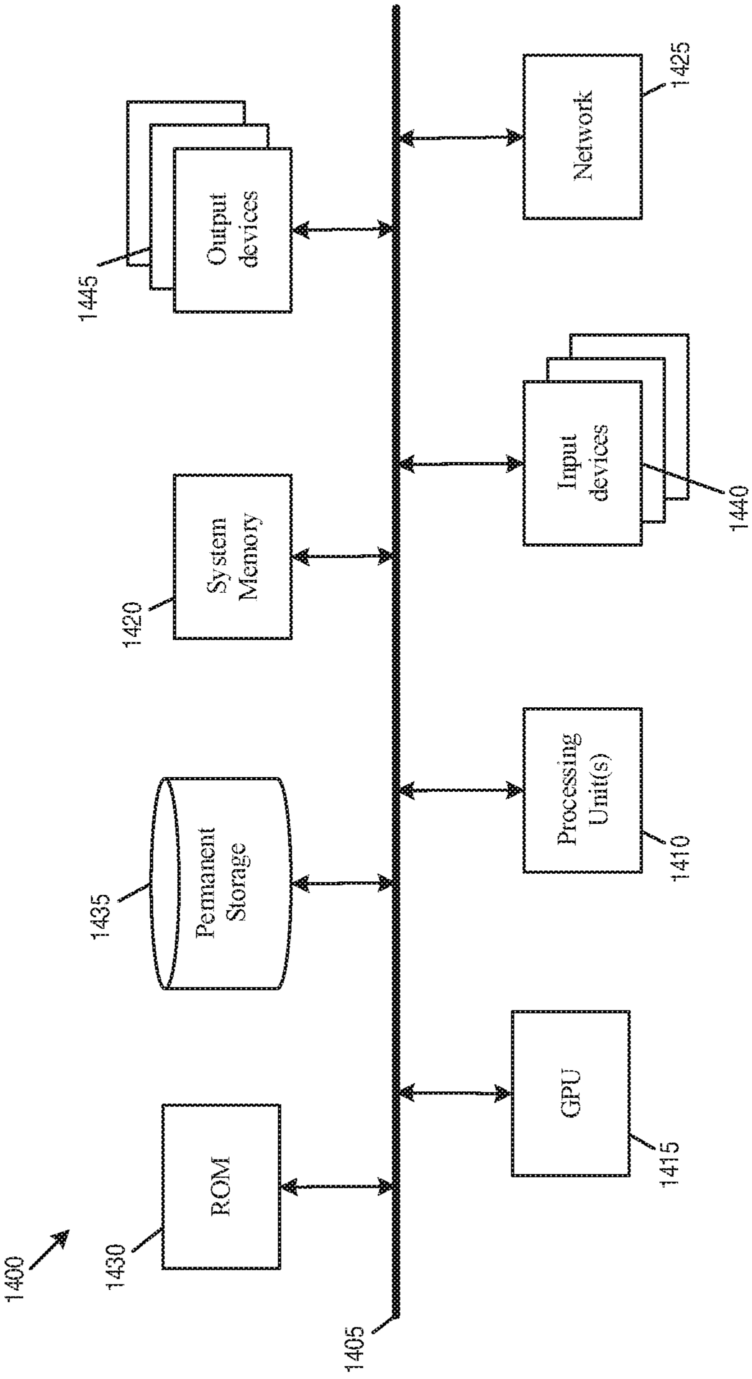
FIG. 14 conceptually illustrates an electronic system with which some embodiments of the present disclosure are implemented.

FIG. 14 conceptually illustrates an electronic system 1400 with which some embodiments of the present disclosure are implemented. The electronic system 1400 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1400 includes a bus 1405, processing unit(s) 1410, a graphics-processing unit (GPU) 1415, a system memory 1420, a network 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the GPU 1415, the read-only memory 1430, the system memory 1420, and the permanent storage device 1435.

From these various memory units, the processing unit(s) 1410 retrieves instructions to execute and data to process in order to execute the processes of the present disclosure. The processing unit(s) may be a single processor or a multi-core processor in different embodiments. Some instructions are passed to and executed by the GPU 1415. The GPU 1415 can offload various computations or complement the image processing provided by the processing unit(s) 1410.

The read-only-memory (ROM) 1430 stores static data and instructions that are used by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the present disclosure use a mass-storage device (such as a magnetic or optical disk and its corresponding disk drive) as the permanent storage device 1435.

Other embodiments use a removable storage device (such as a floppy disk, flash memory device, etc., and its corresponding disk drive) as the permanent storage device. Like the permanent storage device 1435, the system memory 1420 is a read-and-write memory device. However, unlike storage device 1435, the system memory 1420 is a volatile read-and-write memory, such a random access memory. The system memory 1420 stores some of the instructions and data that the processor uses at runtime. In some embodiments, processes in accordance with the present disclosure are stored in the system memory 1420, the permanent storage device 1435, and/or the read-only memory 1430. For example, the various memory units include instructions for processing multimedia clips in accordance with some embodiments. From these various memory units, the processing unit(s) 1410 retrieves instructions to execute and data to process in order to execute the processes of some embodiments.

The bus 1405 also connects to the input and output devices 1440 and 1445. The input devices 1440 enable the user to communicate information and select commands to the electronic system. The input devices 1440 include alphanumeric keyboards and pointing devices (also called "cursor control devices"), cameras (e.g., webcams), microphones or similar devices for receiving voice commands, etc. The output devices 1445 display images generated by the electronic system or otherwise output data. The output devices 1445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 14, bus 1405 also couples electronic system 1400 to a network 1425 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 10 and FIG. 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method comprising:

receiving data for a block of pixels to be encoded or decoded as a current block of a current picture of a video;

constructing a chroma prediction model based on luma and chroma samples neighboring the current block;

signaling a set of chroma prediction related syntax elements or receiving the set of chroma prediction related syntax elements, wherein the chroma prediction model is constructed according to the set of chroma prediction related syntax elements, wherein one of a plurality of chroma prediction modes is chosen as the selected chroma prediction mode based on a discontinuity measurement between predicted chroma samples of the current block and reconstructed chroma samples of a neighboring region of the current block;

refining the chroma prediction model based on a refinement to the chroma prediction model, wherein the refinement is applicable to only a sub-region of the current block, wherein separate refinements for scaling and offset parameters are coded and signaled for different regions of the current block;

performing chroma prediction by applying the refined chroma prediction model to reconstructed luma samples of the current block to obtain the predicted chroma samples of the current block; and using the predicted chroma samples to reconstruct chroma samples of the current block or to encode the current block.

2. The video coding method of claim 1, further comprising signaling a refinement to the chroma prediction model or receiving the refinement to the chroma prediction model.

3. The video coding method of claim 2, wherein the chroma prediction model has model parameters that comprise a scaling parameter and an offset parameter and the refinement to the chroma prediction model comprises an adjustment to the scaling parameter and an adjustment to the offset parameter.

4. The video coding method of claim 2, wherein the chroma prediction model has a set of model parameters that comprise a scaling parameter and an offset parameter for each chroma component, wherein the signaled refinement comprises adjustments to the scaling parameter but not the offset parameter of each chroma component.

5. The video coding method of claim 4, wherein the signaled refinement comprises one adjustment that is applicable to the scaling parameters of both chroma components, wherein the offset parameter of each chroma components is implicitly adjusted.

6. The video coding method of claim 4, wherein the offset parameter is derived from the adjusted scaling parameter.

7. The video coding method of claim 2, wherein the chroma prediction model comprises model parameters for each chroma component, wherein the signaled refinement comprises adjustment to the model parameters of a first chroma component but no adjustment to the model parameters of a second chroma component.

8. The video coding method of claim 2 wherein the refinement further comprises a sign of the adjustment to the scaling parameter of at least one chroma component.

9. The video coding method of claim 2, wherein the chroma prediction model is one of a plurality of chroma prediction models applied to the reconstructed luma samples of the current block to obtain the predicted chroma samples of the current block, wherein the refinement comprises adjustment to the model parameters of the plurality of chroma prediction models.

10. The video coding method of claim 1, wherein different methods are used to signal or receive the set of chroma prediction related syntax elements for when the current block is greater than or equal to a threshold size and for when the current block is smaller than a threshold size.

11. The video coding method of claim 1, wherein the set of chroma prediction related syntax elements selects one of a plurality of different chroma prediction modes that refer to different regions neighboring the current block, wherein the applied chroma prediction model is constructed according to the selected chroma prediction mode.

12. The video coding method of claim 1, wherein a list of candidates that comprise the plurality of chroma prediction modes are reordered based on a comparison of the chroma predictions obtained by the different chroma prediction modes.

13. The video coding method of claim 1, wherein one of the plurality of chroma prediction modes is chosen as the selected chroma prediction mode based on a luma intra angle information of the current block.

14. The video coding method of claim 1, wherein one of the plurality of chroma prediction modes is chosen as the selected chroma prediction mode based on a splitting information of a neighboring block.

15. The video coding method of claim 1, wherein one of the plurality of chroma prediction modes is chosen as the selected chroma prediction mode based on a size, a width, or a height of the current block.

16. The video coding method of claim 1, wherein chroma prediction models constructed according to different chroma prediction modes are used to perform chroma prediction for different sub-regions of the current block.

17. An electronic apparatus comprising:

a video coding circuit configured to perform operations comprising:

receiving data for a block of pixels to be encoded or decoded as a current block of a current picture of a video;

constructing a chroma prediction model based on luma and chroma samples neighboring the current block;

signaling a set of chroma prediction related syntax elements or receiving the set of chroma prediction related syntax elements, wherein the chroma prediction model is constructed according to the set of chroma prediction related syntax elements, wherein one of a plurality of chroma prediction modes is chosen as the selected chroma prediction mode based on a discontinuity measurement between predicted chroma samples of the current block and reconstructed chroma samples of a neighboring region of the current block;

refining the chroma prediction model based on a refinement to the chroma prediction model, wherein the refinement is applicable to only a sub-region of the current block, wherein separate refinements for scaling and offset parameters are coded and signaled for different regions of the current block;

performing chroma prediction by applying the refined chroma prediction model to reconstructed luma samples of the current block to obtain the predicted chroma samples of the current block; and using the predicted chroma samples to reconstruct chroma samples of the current block or to encode the current block.

* * * * *